United States Patent
Wu et al.

(10) Patent No.: US 10,680,697 B2
(45) Date of Patent: Jun. 9, 2020

(54) CHANNEL STATE INFORMATION FEEDBACK METHOD, BASE STATION, TERMINAL DEVICE, AND SYSTEM

(71) Applicant: Huawei Technologies Co., Ltd., Shenzhen, Guangdong (CN)

(72) Inventors: Lu Wu, Shenzhen (CN); Xiaoyan Bi, Shanghai (CN); Peng Shang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/185,383

(22) Filed: Nov. 9, 2018

(65) Prior Publication Data
US 2019/0081680 A1   Mar. 14, 2019

Related U.S. Application Data

(63) Continuation of application No. PCT/CN2017/083585, filed on May 9, 2017.

(30) Foreign Application Priority Data

May 12, 2016 (CN) .......................... 2016 1 0319659

(51) Int. Cl.
H04B 7/06 (2006.01)
H04B 7/04 (2017.01)
(Continued)

(52) U.S. Cl.
CPC ............ *H04B 7/0626* (2013.01); *H04B 7/04* (2013.01); *H04B 7/0456* (2013.01);
(Continued)

(58) Field of Classification Search
CPC combination set(s) only.
See application file for complete search history.

(56) References Cited

U.S. PATENT DOCUMENTS

2007/0104283 A1   5/2007  Han et al.
2010/0215112 A1   8/2010  Tsai et al.
(Continued)

FOREIGN PATENT DOCUMENTS

CA    2853239 C    8/2017
CN  101783776 A    7/2010
(Continued)

OTHER PUBLICATIONS

Ericsson, "2D Codebook with KP structure and associated feedback," R1-153168, 3GPP TSG-RAN WG#81, Fukuoka, Japan, May 25-29, 2015, 4 pages, XP050973374.

*Primary Examiner* — Syed Haider
*Assistant Examiner* — Amneet Singh
(74) *Attorney, Agent, or Firm* — Leydig, Voit & Mayer, Ltd.

(57) ABSTRACT

The present disclosure discloses a channel state information feedback method, a base station, a terminal device, and a system. The method includes: receiving, by a terminal device, a reference signal sent by a base station; determining, by the terminal device, channel state information based on the reference signal; and sending, by the terminal device, the channel state information to the base station, so that the base station determines a precoding matrix F. The precoding matrix $F=C_1C_2W$, where $C_1$ is a first-level precoding matrix, $C_2$ is a second-level precoding matrix, and W is a third-level precoding matrix. Channel state information corresponding to $C_1$ includes beam information, channel state information corresponding to $C_2$ includes long-term wideband channel information, and channel state information corresponding to W includes instantaneous channel information. This patent application can reduce total pilot and CSI feedback overheads, thereby improving a system throughput.

12 Claims, 18 Drawing Sheets

(51) Int. Cl.
*H04L 1/00* (2006.01)
*H04B 7/0456* (2017.01)
*H04L 25/02* (2006.01)
*H04L 5/00* (2006.01)
*H04W 88/08* (2009.01)

(52) U.S. Cl.
CPC ......... *H04B 7/0478* (2013.01); *H04B 7/0482* (2013.01); *H04B 7/06* (2013.01); *H04B 7/0632* (2013.01); *H04B 7/0634* (2013.01); *H04B 7/0639* (2013.01); *H04B 7/0658* (2013.01); *H04L 1/00* (2013.01); *H04L 25/0204* (2013.01); *H04L 25/0224* (2013.01); *H04L 5/0023* (2013.01); *H04L 5/0048* (2013.01); *H04L 5/0091* (2013.01); *H04W 88/08* (2013.01)

(56) References Cited

U.S. PATENT DOCUMENTS

| | | | |
|---|---|---|---|
| 2012/0039282 A1* | 2/2012 | Kim | H04W 52/54 370/329 |
| 2012/0147933 A1 | 6/2012 | Li et al. | |
| 2013/0089159 A1 | 4/2013 | Liu | |
| 2015/0092824 A1 | 4/2015 | Wicker, Jr. et al. | |
| 2015/0117370 A1 | 4/2015 | Prasad et al. | |
| 2015/0124688 A1 | 5/2015 | Xu et al. | |
| 2015/0131750 A1 | 5/2015 | Xue et al. | |
| 2016/0173176 A1 | 6/2016 | Mizusawa | |
| 2018/0212665 A1* | 7/2018 | Li | H04B 7/0469 |
| 2019/0089441 A1* | 3/2019 | Sivahumaran | H04B 7/0478 |

FOREIGN PATENT DOCUMENTS

| | | |
|---|---|---|
| CN | 102148663 A | 8/2011 |
| CN | 103026652 A | 4/2013 |
| CN | 104025657 A | 9/2014 |
| CN | 105474556 A | 4/2016 |
| EP | 2557720 A1 | 2/2013 |
| EP | 2584727 A1 | 4/2013 |
| EP | 2985921 A1 | 2/2016 |
| WO | 2010102583 A1 | 9/2010 |
| WO | 2015109463 A1 | 7/2015 |
| WO | 2015120612 A1 | 8/2015 |
| WO | 2015/13116 A1 | 9/2015 |

* cited by examiner

CHANNEL STATE INFORMATION FEEDBACK METHOD, BASE STATION, TERMINAL DEVICE, AND SYSTEM

CROSS-REFERENCE TO RELATED APPLICATIONS

This application is a continuation of International Application No. PCT/CN2017/083585, filed on May 9, 2017, which claims priority to Chinese Patent Application No. 201610319659.2, filed on May 12, 2016. The disclosures of the aforementioned applications are hereby incorporated by reference in their entireties.

TECHNICAL FIELD

The present application relates to the communications field, and more specifically, to a channel state information feedback method, a base station, a terminal device, and a system.

BACKGROUND

Emergence of a multiple-input multiple-output (MIMO) technology brings a revolutionary change to wireless communication. A plurality of antennas are simultaneously deployed on a transmit end device and a receive end device, so that the MIMO technology can simultaneously provide a plurality of mutually independent channels, and therefore, a data transmission rate is multiplied. Precoding is used in the MIMO technology. In a conventional one-level precoding structure, a quantity of radio frequency channels is the same as a quantity of transmit antennas.

In massive MIMO, a large quantity of antennas are used to improve link quality, cell coverage, system performance, and spectrum efficiency. To obtain a high spatial degree of freedom that can be provided by large-scale antennas, a data transmit end needs to obtain related channel state information (CSI), so as to implement accurate precoding.

When there are a small quantity of antennas on the data transmit end, pilot overheads and a CSI feedback amount can be controlled. However, when there are a relatively large quantity of antennas, pilot overheads and a CSI feedback amount occupy a large quantity of time-frequency resources, and consequently time-frequency resources available for data transmission are compressed, and a system throughput is severely affected.

SUMMARY

A technical problem to be resolved in embodiments of this patent application is to provide a channel state information feedback method, a base station, a terminal device, and a system, to resolve a technical problem in the prior art that when there are a relatively large quantity of antennas on a data transmit end, a system throughput is affected.

According to a first aspect, an embodiment of this application provides a channel state information feedback method. The method includes: sending, by a base station, a reference signal to a terminal device; receiving, by the base station, channel state information sent by the terminal device; and determining, by the base station, a precoding matrix F based on the channel state information. The precoding matrix $F=C_1C_2W$, where $C_1$ is a first-level precoding matrix, $C_2$ is a second-level precoding matrix, and W is a third-level precoding matrix. Channel state information corresponding to $C_1$ includes beam information, channel state information corresponding to $C_2$ includes long-term wideband channel information, and channel state information corresponding to W includes instantaneous channel information.

In a possible design, the sending, by a base station, a reference signal to a terminal device includes: sending, by the base station, a first-level reference signal to the terminal device; the receiving, by the base station, channel state information sent by the terminal device includes: receiving, by the base station, the beam information sent by the terminal device, where the beam information is determined based on the first-level reference signal; and the determining, by the base station, a precoding matrix based on the channel state information includes: determining, by the base station, the first-level precoding matrix based on the beam information.

In a possible design, the sending, by a base station, a reference signal to a terminal device includes: sending, by the base station, a second-level reference signal to the terminal device. The receiving, by the base station, channel state information sent by the terminal device includes: receiving, by the base station, the long-term wideband channel information sent by the terminal device, where the long-term wideband channel information is determined based on the second-level reference signal. The determining, by the base station, a precoding matrix based on the channel state information includes: determining, by the base station, the second-level precoding matrix based on the long-term wideband channel information.

In a possible design, the long-term wideband channel information includes information about a channel space correlation matrix.

In a possible design, the sending, by a base station, a reference signal to a terminal device includes: sending, by the base station, a third-level reference signal to the terminal device. The receiving, by the base station, channel state information sent by the terminal device includes: receiving, by the base station, the instantaneous channel information sent by the terminal device, where the instantaneous channel information is determined based on the third-level reference signal. The determining, by the base station, a precoding matrix based on the channel state information includes: determining, by the base station, the third-level precoding matrix based on the instantaneous channel information.

In a possible design, the sending, by the base station, a first-level reference signal to the terminal device includes: sending, by the base station, the first-level reference signal whose quantity of antenna ports is $M_{TXRU}$ to the terminal device.

In a possible design, the sending, by the base station, a second-level reference signal to the terminal device includes: sending, by the base station, the second-level reference signal whose quantity of antenna ports is $M_{TXRU}$ to the terminal device.

In a possible design, the sending, by the base station, a third-level reference signal to the terminal device includes: sending, by the base station, the third-level reference signal whose quantity of antenna ports is S to the terminal device.

According to a second aspect, an embodiment of this patent application provides a channel state information feedback method. The method includes: receiving, by a terminal device, a reference signal sent by a base station; determining, by the terminal device, channel state information based on the reference signal; and sending, by the terminal device, the channel state information to the base station, so that the base station determines a precoding matrix F. The precoding matrix $F=C_1C_2W$, where $C_1$ is a first-level precoding matrix, $C_2$ is a second-level precoding matrix, W is a third-level precoding matrix, channel state information corresponding to $C_1$ includes beam information, channel state information corresponding to $C_2$ includes long-term wideband channel information, and channel state information corresponding to W includes instantaneous channel information.

In a possible design, the receiving, by a terminal device, a reference signal sent by a base station includes: receiving, by the terminal device, a first-level reference signal sent by the base station. The determining, by the terminal device, channel state information based on the reference signal includes: determining, by the terminal device, the beam information based on the first-level reference signal. The sending, by the terminal device, the channel state information to the base station includes: sending, by the terminal device, the beam information to the base station.

In a possible design, the receiving, by a terminal device, a reference signal sent by a base station includes: receiving, by the terminal device, a second-level reference signal sent by the base station. The determining, by the terminal device, channel state information based on the reference signal includes: determining, by the terminal device, the long-term wideband channel information based on the second-level reference signal, where the long-term wideband channel information is used by the base station to obtain $C_2$. The sending, by the terminal device, the channel state information to the base station includes: sending, by the terminal device, the long-term wideband channel information to the base station.

In a possible design, the long-term wideband channel information includes information about a channel space correlation matrix.

In a possible design, the receiving, by a terminal device, a reference signal sent by a base station includes: receiving, by the terminal device, a third-level reference signal sent by the base station. The determining, by the terminal device, channel state information based on the reference signal includes: determining, by the terminal device, the instantaneous channel information based on the third-level reference signal. The sending, by the terminal device, the channel state information to the base station includes: sending, by the terminal device, the instantaneous channel information to the base station.

According to a third aspect, an embodiment of this patent application provides a terminal device. The terminal device includes: a receiving module, configured to receive a reference signal sent by a base station; a processing module, configured to determine channel state information based on the reference signal; and a sending module, configured to send the channel state information to the base station, so that the base station determines a precoding matrix F. The precoding matrix $F=C_1C_2W$, where $C_1$ is a first-level precoding matrix, $C_2$ is a second-level precoding matrix, and W is a third-level precoding matrix. Channel state information corresponding to $C_1$ includes beam information, channel state information corresponding to $C_2$ includes long-term wideband channel information, and channel state information corresponding to W includes instantaneous channel information.

In a possible design, the reference signal includes a first-level reference signal. That the processing module is configured to determine the channel state information based on the reference signal includes: The processing module is configured to determine the beam information based on the first-level reference signal. That the sending module is configured to send the channel state information to the base station includes: The sending module is configured to send the beam information to the base station.

In a possible design, the reference signal includes a second-level reference signal. That the processing module is configured to determine the channel state information based on the reference signal includes: The processing module is configured to determine the long-term wideband channel information based on the second-level reference signal, where the long-term wideband channel information is used by the base station to obtain $C_2$. That the sending module is configured to send the channel state information to the base station includes: The sending module is configured to send the long-term wideband channel information to the base station.

In a possible design, the long-term wideband channel information includes information about a channel space correlation matrix.

In a possible design, the reference signal includes a third-level reference signal. The reference signal includes a third-level reference signal. That the processing module is configured to determine the channel state information based on the reference signal includes: The processing module is configured to determine the instantaneous channel information based on the third-level reference signal. That the sending module is configured to send the channel state information to the base station includes: The sending module is configured to send the instantaneous channel information to the base station.

According to a fourth aspect, an embodiment of this patent application provides a base station. The base station includes: a sending module, configured to send a reference signal to a terminal device; a receiving module, configured to receive channel state information sent by the terminal device; and a processing module, configured to determine a precoding matrix F based on the channel state information. The precoding matrix $F=C_1C_2W$, where $C_1$ is a first-level precoding matrix, $C_2$ is a second-level precoding matrix, and W is a third-level precoding matrix. Channel state information corresponding to $C_1$ includes beam information, channel state information corresponding to $C_2$ includes long-term wideband channel information, and channel state information corresponding to W includes instantaneous channel information.

In a possible design, the reference signal includes a first-level reference signal. That the processing module is configured to determine the channel state information based on the reference signal includes: The processing module is configured to determine the beam information based on the first-level reference signal. That the sending module is configured to send the channel state information to the base station includes: The sending module is configured to send the beam information to the base station.

In a possible design, the reference signal includes a second-level reference signal. That the processing module is configured to determine the channel state information based on the reference signal includes: The processing module is configured to determine the long-term wideband channel information based on the second-level reference signal, where the long-term wideband channel information is used by the base station to obtain $C_2$. That the sending module is configured to send the channel state information to the base station includes: The sending module is configured to send the long-term wideband channel information to the base station.

In a possible design, the long-term wideband channel information includes information about a channel space correlation matrix.

In a possible design, the reference signal includes a third-level reference signal. That the processing module is configured to determine the channel state information based on the reference signal includes: The processing module is configured to determine the instantaneous channel information based on the third-level reference signal. That the sending module is configured to send the channel state information to the base station includes: The sending module is configured to send the instantaneous channel information to the base station.

According to a fifth aspect, an embodiment of this patent application provides a channel state information feedback method, and the method includes: receiving, by a terminal device, a first-level reference signal sent by a base station, and sending first channel state information to the base station, where the first channel state information is used to indicate information about a first virtual sector; receiving, by the terminal device within a range of the first virtual sector, a second-level reference signal sent by the base station, and sending second channel state information to the base station, so that the base station performs spatial dimension reduction on the virtual sector, where the second channel state information is used to indicate long-term wideband channel information; and receiving, by the terminal device in the virtual sector on which spatial dimension reduction is performed, a third-level reference signal sent by the base station, and sending third channel state information to the base station, where the third channel state information is used to indicate instantaneous channel information.

According to a sixth aspect, an embodiment of this patent application provides a channel state information feedback method. The method includes:

sending, by a base station, a first-level reference signal to a terminal device, and receiving, by the base station, first channel state information sent by the terminal device, where the first channel state information is used to indicate information about a first virtual sector; sending, by the base station within a range of the first virtual sector, a second-level reference signal to the terminal device, and receiving second channel state information sent by the terminal device, to perform spatial dimension reduction on the virtual sector, where the second channel state information is used to indicate long-term wideband channel information; and sending, by the base station in the virtual sector on which spatial dimension reduction is performed, a third-level reference signal to the terminal device, and receiving third channel state information sent by the terminal device, where the third channel state information is used to indicate instantaneous channel information.

According to another aspect, an embodiment of this patent application provides a terminal device. The terminal device includes a memory configured to store an instruction, a transceiver, and a processor. The processor is coupled to the memory and the transceiver, and when the processor executes the instruction, the instruction enables the terminal device to perform the channel state information feedback method in the second aspect or the sixth aspect.

According to another aspect, an embodiment of this patent application provides a base station. The base station includes a memory configured to store an instruction, a transceiver, and a processor. The processor is coupled to the memory and the transceiver, and when the processor executes the instruction, the instruction enables the terminal device to perform the channel state information feedback method in the first aspect or the fifth aspect.

With reference to any one of the foregoing aspects, in a possible design, $C_1$ is an $N_{Tx} \times M_{TXRU}$ matrix, where $M_{TXRU}$ represents a quantity of transmit radio frequency channels of the base station, $N_{Tx}$ represents a quantity of transmit antennas of the base station, and $M_{TXRU} \leq N_{Tx}$. $C_2$ is an $M_{TXRU} \times S$ matrix, where S is a quantity of data streams on which third-level precoding processing is performed, and $S \leq M_{TXRU}$. W is an $S \times K$ matrix, where K represents a quantity of streams in data transmission, and $K \leq S$.

According to another aspect, an embodiment of the present application provides a communications system, and the system includes the base station and the terminal device that are described in the foregoing aspects.

According to still another aspect, an embodiment of the present application provides a computer storage medium, configured to store a computer software instruction used by the foregoing base station, and the computer storage medium includes a program designed for executing the foregoing aspects.

According to still another aspect, an embodiment of the present application provides a computer storage medium, configured to store a computer software instruction used by the foregoing UE, and the computer storage medium includes a program designed for executing the foregoing aspects.

In this patent application, the used precoding matrix is $F=C_1C_2W$, and is a three-level precoding processing manner. Channel state information corresponding to a third-level precoding matrix W includes instantaneous channel information, and has a relatively short feedback period. Virtual sector division is implemented by using beam information corresponding to a first-level precoding matrix $C_1$. A second-level precoding matrix $C_2$ is obtained by using long-term wideband channel information, to further reduce a spatial dimension of a virtual sector. In this way, a feedback amount of the instantaneous channel information is greatly reduced, so that total pilot and CSI feedback overheads are reduced, thereby improving a system throughput. In addition, in this patent application, baseband processing complexity and radio frequency implementation difficulty can be effectively reduced.

In this patent application, virtual sector division is implemented by using the first-level precoding matrix $C_1$. The spatial dimension of the virtual sector is further reduced by using the second-level precoding matrix $C_2$, and a beam pointing to the terminal device becomes narrower. In this way, transmit and receive signal interference between terminal devices can be greatly reduced, thereby improving the system throughput.

DESCRIPTION OF EMBODIMENTS

With development of communications theories and practice, more wireless communications technologies appear and gradually become mature. The wireless communications technologies include but are not limited to: a Time Division Multiple Access (TDMA) technology, a Frequency Division Multiple Access (FDMA) technology, a Code Division Multiple Access (CDMA) technology, Time Division-Synchronous Code Division Multiple Access (TD-SCDMA), an orthogonal Frequency Division Multiple Access (OFDMA) technology, a single carrier Frequency Division Multiple Access (SC-FDMA) technology, a Space Division Multiple Access (SDMA) technology, and a technology evolving from these technologies. The foregoing wireless communications technologies are used in many wireless communications standards as a radio access technology (RAT), thereby constructing various well-known wireless communications systems, including but not limited to Global System for Mobile Communications (GSM), CDMA 2000, wideband CDMA (WCDMA), WiFi defined in the 802.11 series of standards, Worldwide Interoperability for Microwave Access (WiMAX), Long Term Evolution (LTE), LTE-Advanced (LTE-A), a system evolving from these wireless communications systems, and the like. Unless otherwise specified, the technical solutions provided in the embodiments of this patent application may be applied to the foregoing various wireless communications technologies and wireless communications systems. In addition, the terms "system" and "network" can be interchanged.

Figure 1:
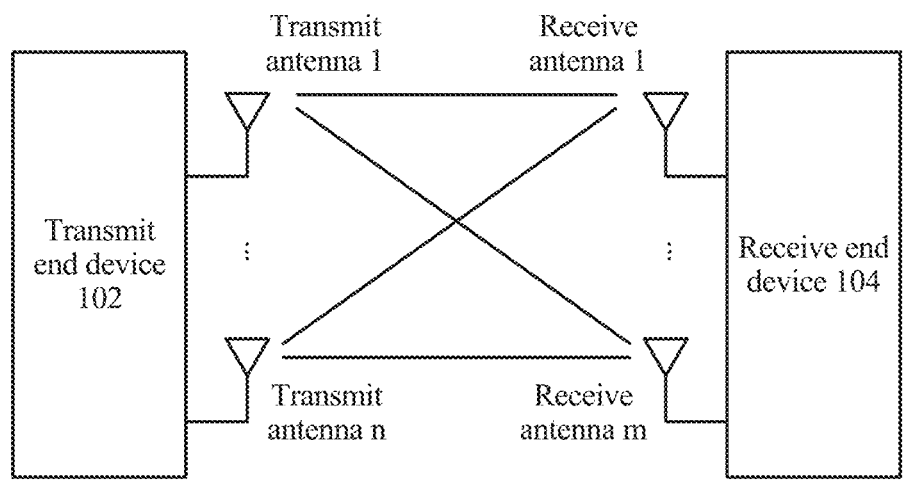
FIG. 1 is a schematic diagram of an application scenario of MIMO.

FIG. 1 is a schematic diagram of an application scenario of MIMO. The application scenario shown in FIG. 1 includes a transmit end device 102 and a receive end device 104. The transmit end device 102 may be, by way of example but not limitation, a base station. The receive end device 104 may be, by way of example but not limitation, a terminal device. n(n>1) transmit antennas are configured on the transmit end device 102, and are specifically represented by transmit antennas 1 to n. m(m>1) receive antennas are configured on the receive end device 104, and are specifically represented by receive antennas 1 to m. In this way, there are a total of m×n channels between the n transmit antennas and the m receive antennas, as shown in solid lines between the transmit antennas 1 to n and the receive antennas 1 to m (some channels are not shown).

In an ideal case (for example, noise is not considered), the m×n channels may be represented by using the following channel matrix:

$$H = \begin{bmatrix} h_{11} & \cdots & h_{1n} \\ \vdots & \ddots & \vdots \\ h_{m1} & \cdots & h_{mn} \end{bmatrix}.$$

$h_{ij}$(1≤i≤m, 1≤j≤n) represents a channel gain between a transmit antenna j and a receive antenna i. The receive end device 104 may determine the foregoing channel matrix by using a pilot (Pilot) transmitted by the transmit end device 102. The pilot may also be referred to as a reference signal.

Figure 2:
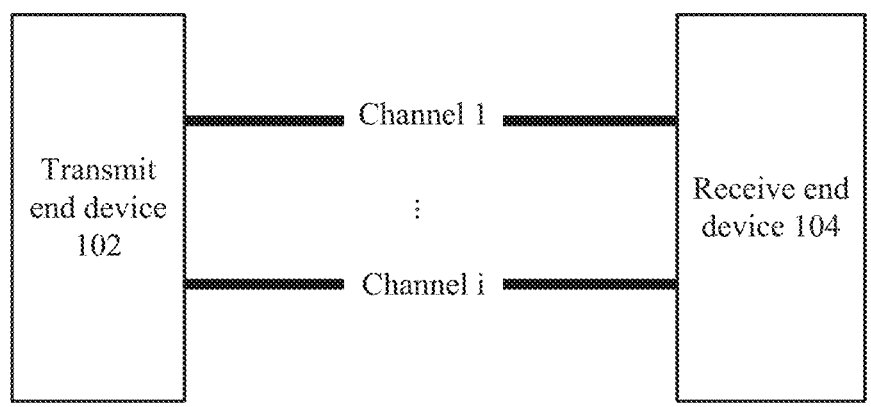
FIG. 2 is a schematic diagram of an equivalent channel of MIMO.

As shown in FIG. 2, the m×n channels may be equivalent to i mutually independent channels. These channels may be obtained by using a plurality of technologies, for example, a precoding technology. A beam is defined in a conventional precoding technology by using a precoding matrix. Specifically, column vectors (also referred to as a precoding vector of the precoding matrix are orthogonal to each other, and each column vector is corresponding to one beam. An element of the column vector is in a one-to-one correspondence with an antenna or an antenna port, and is used to perform weighting on the antenna, so that signals transmitted by antennas overlap with each other, to form a beam. A quantity of beams of the terminal device is equal to a quantity of singular values of a channel matrix, namely, a rank of the channel matrix. When some singular values are extremely small, for example, are less than a preset threshold, a quantity of extremely small singular values may be subtracted from the foregoing quantity. In the conventional precoding technology, the precoding matrix is recorded by using a plurality of preset codebooks. The receive end device 104 selects an appropriate precoding matrix from the plurality of codebooks based on the foregoing channel matrix and based on a preset selection standard (by way of example but not limitation, a maximum channel capacity criterion, a minimum mean square error criterion, or a minimum singular value criterion). There are a plurality of algorithms available for each selection standard.

Figure 3:
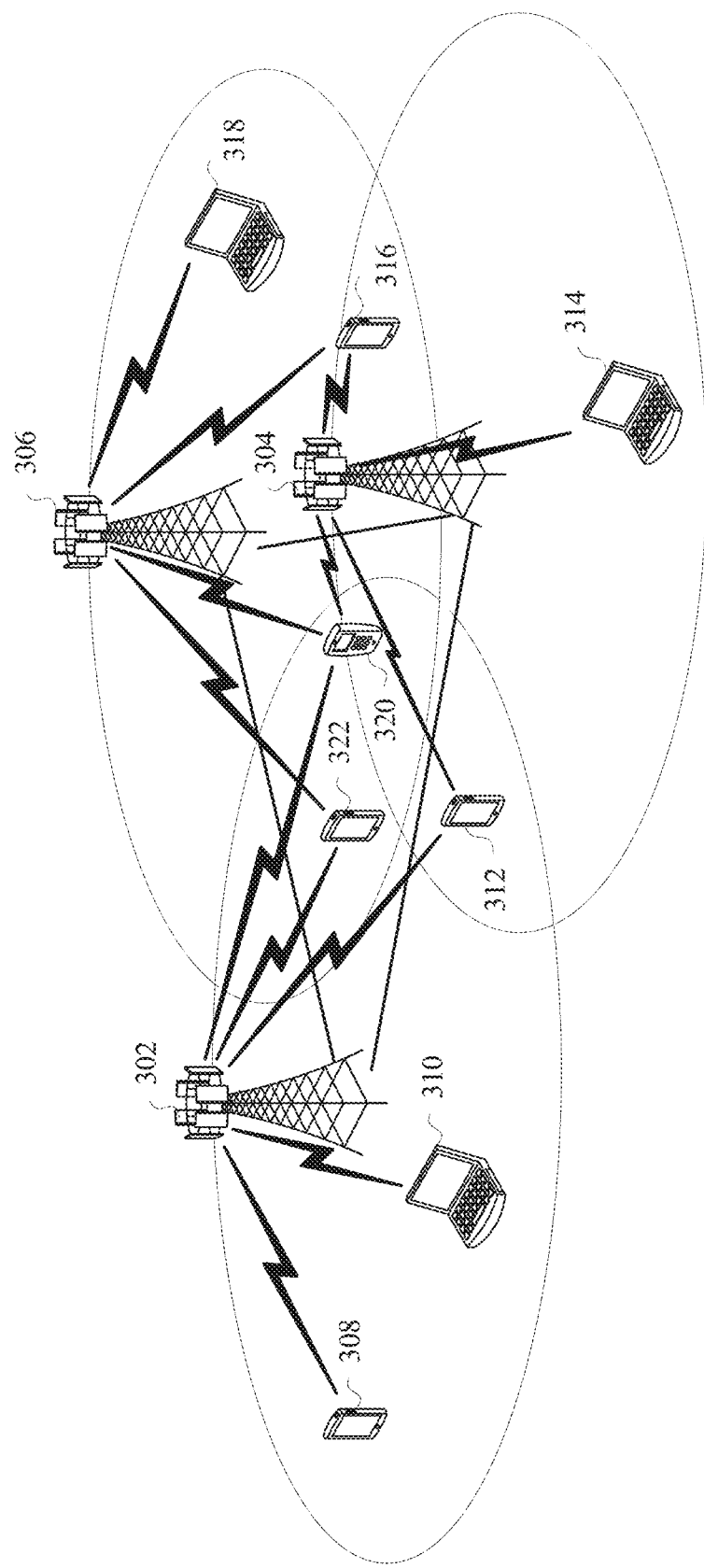
FIG. 3 is an example schematic diagram of a wireless communications network according to an embodiment of the present application.

FIG. 3 is an example schematic diagram of a wireless communications network 300 according to an embodiment of this patent application. As shown in FIG. 3, the wireless communications network 300 includes base stations 302 to 306 and terminal devices 308 to 322. The base stations 302 to 306 may communicate with each other by using backhaul links. Straight lines between the base stations 302 to 306 show the backhaul links. The backhaul link may be a wired backhaul link (for example, an optical fiber or a copper cable), or may be a wireless backhaul link (for example, a microwave). The terminal devices 308 to 322 may communicate with the base stations 302 to 306 by using radio links. Broken lines between the base stations 302 to 306 and the terminal devices 308 to 322 show the radio links.

The base stations 302 to 306 are configured to provide a wireless access service for the terminal devices 308 to 318. Specifically, each base station provides a service coverage area (which may also be referred to as a cell). Each elliptical area in FIG. 3 shows the service coverage area. A terminal device entering the area may communicate with the base station by using a radio signal, to receive the wireless access service provided by the base station. Service coverage areas of the base stations may overlap, and a terminal device located in an overlapping area may receive radio signals from a plurality of base stations. For example, as shown in FIG. 3, service coverage areas of the base station 302 and the base station 304 overlap, and the terminal device 312 is located in an overlapping area. For another example, as shown in FIG. 3, service coverage areas of the base stations 302 to 306 have a common overlapping area, and the terminal device 320 is located in the overlapping area.

The base station may also be referred to as a NodeB, an evolved NodeB (eNodeB), an access point (AP), or the like, depending on which wireless communications technology is used. In addition, based on a size of a provided service coverage area, the base stations may be classified into a macro base station configured to provide a macro cell, a micro base station configured to provide a pico cell, and a femto base station configured to provide a femto cell. With continuous evolution of wireless communications technologies, a future base station may use another name.

The terminal devices 308 to 318 may be various wireless communications devices with a wireless communication function, by way of example but not limitation, a mobile cellular phone, a cordless telephone, a personal digital assistant (PDA), a smartphone, a notebook computer, a tablet computer, a wireless data card, a wireless modem (modulator demodulator modem), or a wearable device such as a smart watch. With emergence of an Internet of Things (IoT) technology, more devices originally without a communication function, by way of example but not limitation, a home appliance, a transportation vehicle, a tool device, a service device, and a service facility, start to obtain a wireless communication function by configuring a wireless communications unit, to access a wireless communications network and be remotely controlled. Such a device has the wireless communication function because the wireless communications unit is configured, and therefore is a wireless communications device. In addition, the terminal devices 308 to 318 may also be referred to as a mobile station, a mobile device, a mobile terminal, a wireless terminal, a handheld device, a client, or the like.

A plurality of antennas can be configured on both the base stations 302 to 306 and the terminal devices 308 to 322, to support a MIMO technology. In addition, the base station 302 may communicate with terminal devices 304 to 310 by using various wireless communications technologies, by way of example but not limitation, various wireless communications technologies described above.

It should be noted that the wireless communications network 300 shown in FIG. 3 is merely used as an example, and is not intended to limit the technical solutions of this patent application. A person skilled in the art should understand that in a specific implementation process, the wireless communications network 300 may further include another device, by way of example but not limitation, a base station controller (BSC), and may configure a base station and a terminal device based on a specific requirement.

Figure 4A:
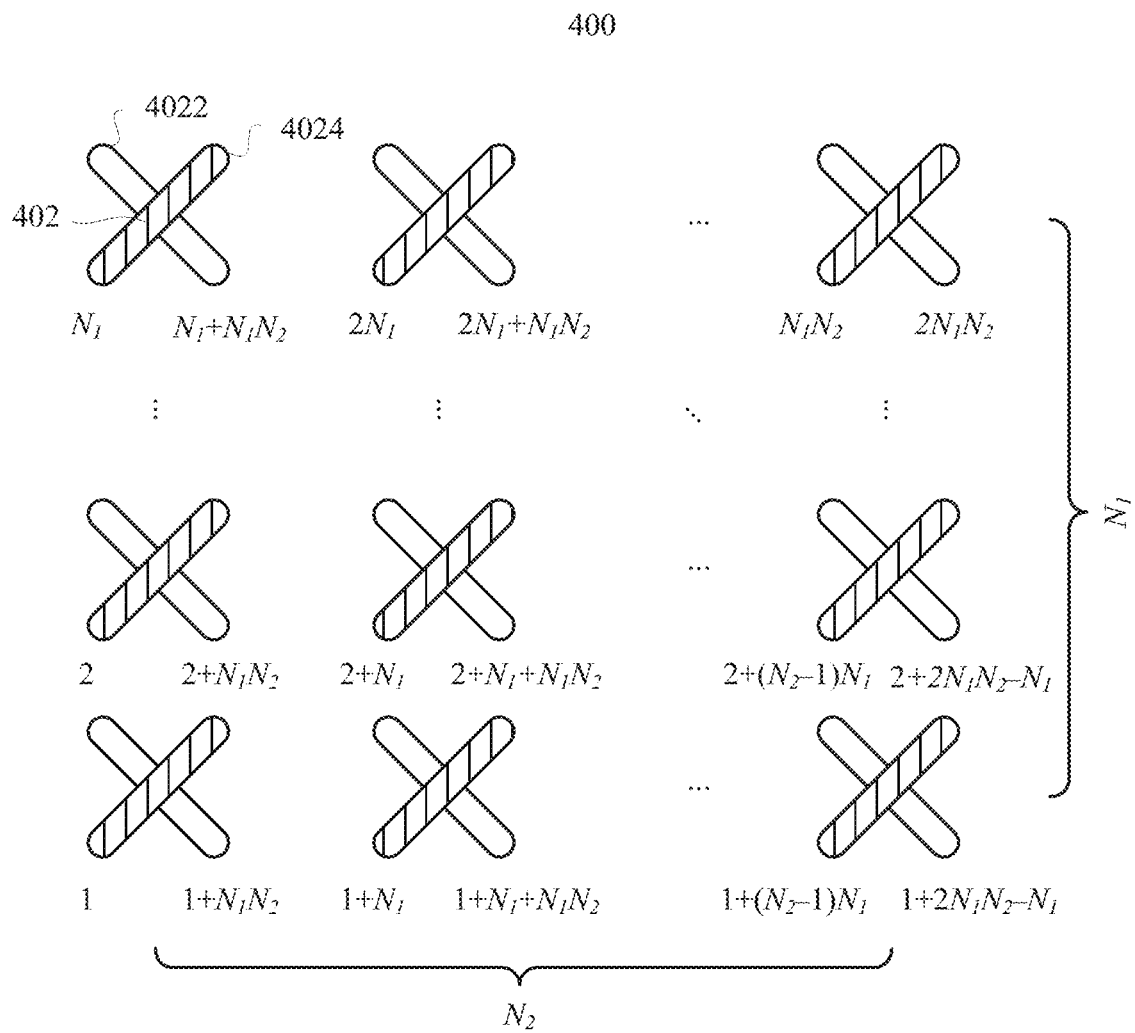
FIG. 4A is an example schematic diagram of an antenna array according to an embodiment of the present application.
Figure 4B:
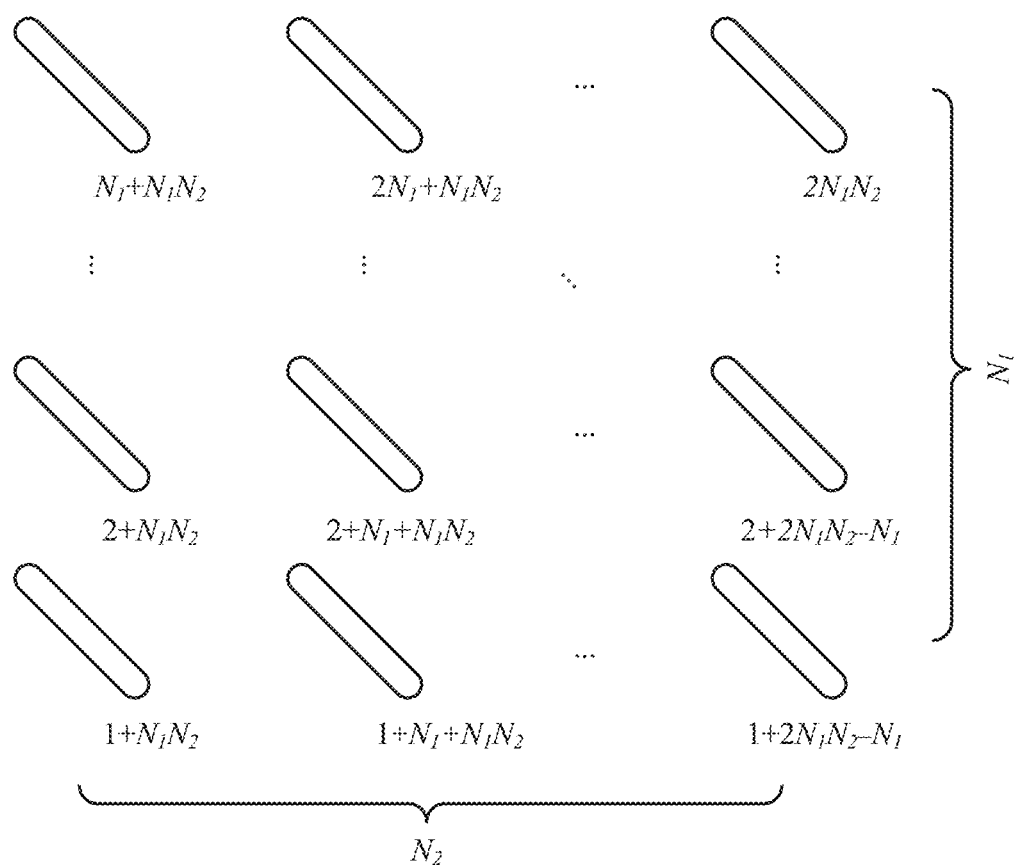
FIG. 4B is an example schematic diagram of a first group of antennas in the antenna array shown in FIG. 4A.
Figure 4C:
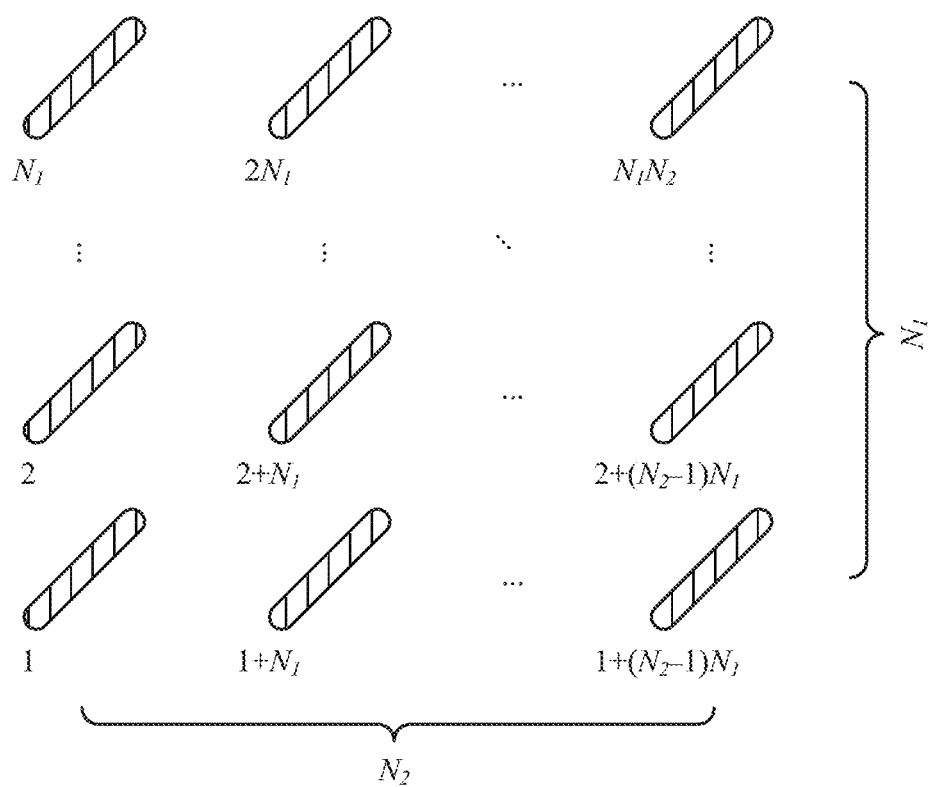
FIG. 4C is an example schematic diagram of a second group of antennas in the antenna array shown in FIG. 4A.

FIG. 4A is an example schematic diagram of an antenna array 400 configured by a base station according to an embodiment of this patent application. As shown in FIG. 4A, the antenna array 400 is a cross polarization antenna array. The antenna array specifically includes $N_1 \times N_2$ cross polarization antenna pairs 402 including $N_1$ rows and $N_2$ columns. A total quantity of antennas is $N_{TX}=2N_1N_2$. Each cross polarization antenna pair includes two antennas 4022 and 4024. A polarization direction of the antenna 4022 is −45 degrees, and a polarization direction of the antenna 4024 is +45 degrees. Therefore, a difference between the polarization direction of the antenna 4022 and the polarization direction of the antenna 4024 is 90 degrees. In other words, the polarization directions of the two antennas are orthogonal to each other. Antennas in the antenna array 400 may be classified into two groups based on polarization directions. A first group of antennas has a polarization direction of −45 degrees, and includes $N_1 \times N_2$ antennas, as shown in FIG. 4B. A second group of antennas has a polarization direction of +45 degrees, and also includes $N_1 \times N_2$ antennas, as shown in FIG. 4C.

Figure 5:
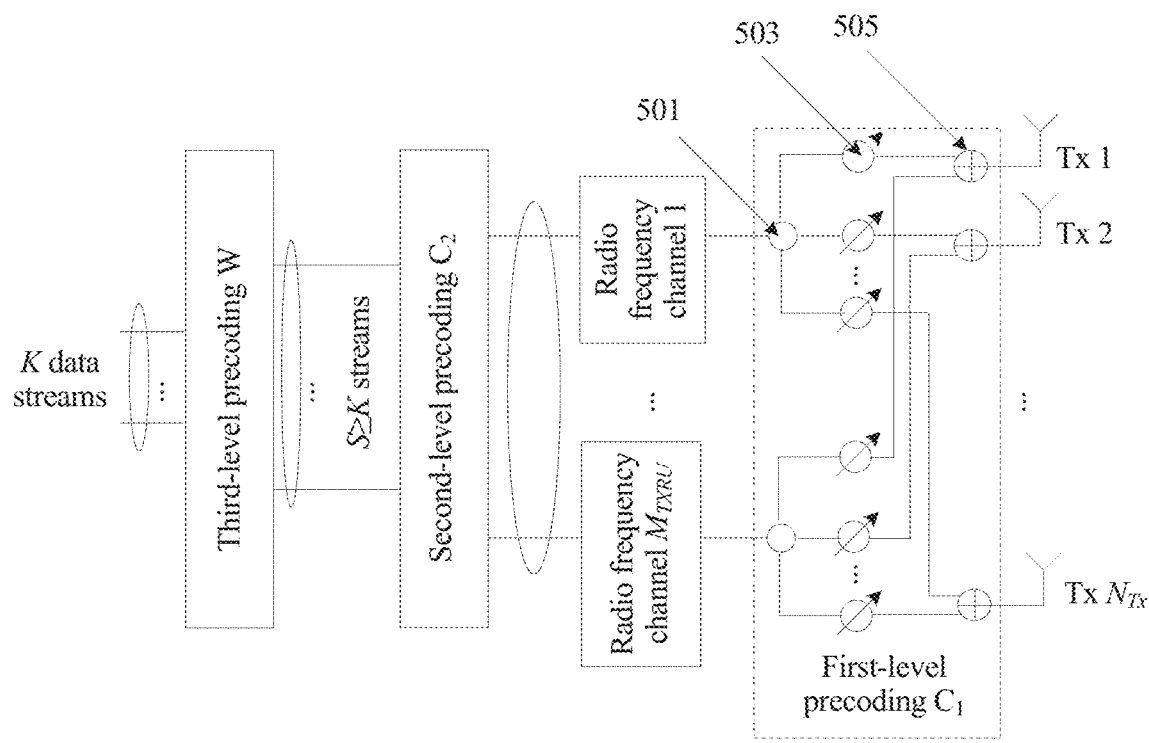
FIG. 5 is a schematic diagram of a three-level precoding process according to an embodiment of this patent application.
Figure 6:
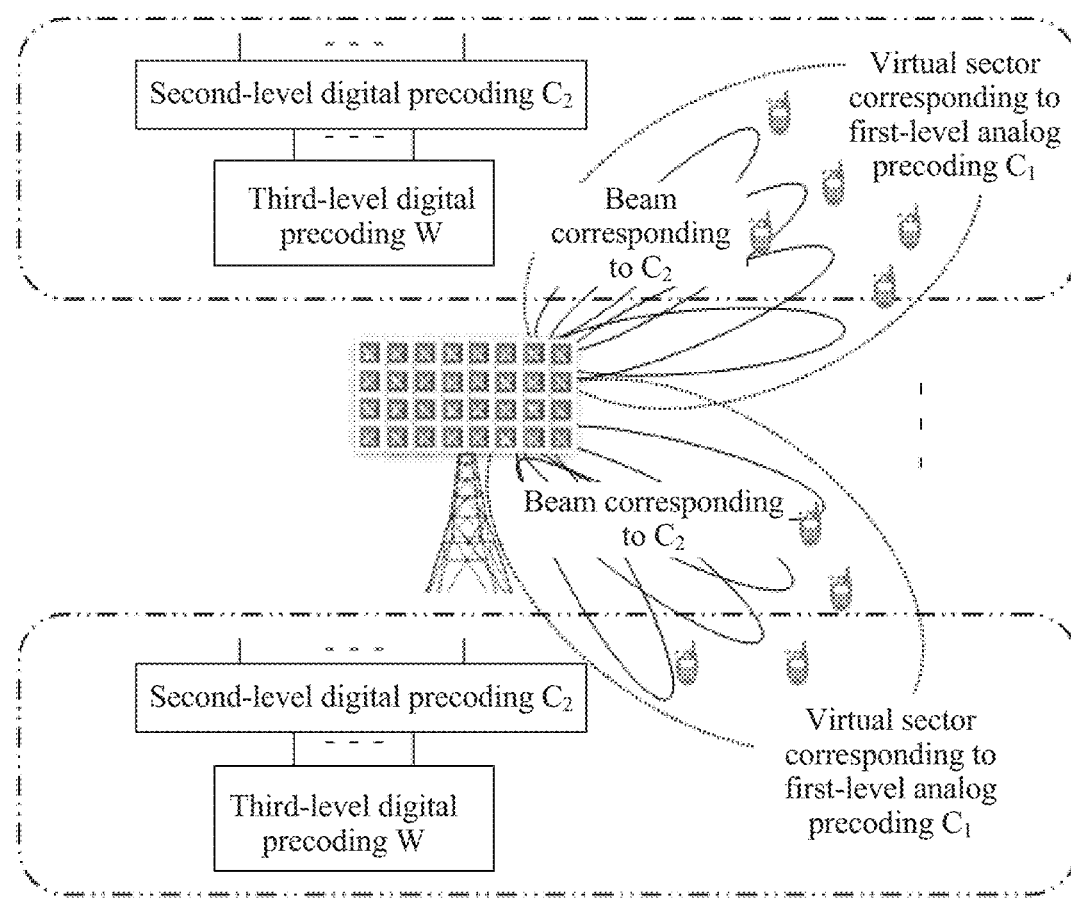
FIG. 6 is a schematic diagram of performing a three-level precoding process by a base station according to an embodiment of this patent application.

FIG. 5 is a schematic diagram of a three-level precoding process according to an embodiment of this patent application. FIG. 6 is a schematic diagram of performing a three-level precoding process by a base station according to an embodiment of this patent application.

Three-level precoding is expressed by using a formula:

$$F = C_1 C_2 W$$

$C_1$ is a first-level precoding matrix, $C_2$ is a second-level precoding matrix, and $W$ is a third-level precoding matrix.

Channel state information corresponding to $C_1$ includes beam information, channel state information corresponding to $C_2$ includes long-term wideband channel information, and channel state information corresponding to $W$ includes instantaneous channel information.

$C_1$ may be the first-level precoding matrix, and may be specifically an $N_{Tx} \times M_{TXRU}$ matrix, where $M_{TXRU}$ represents a quantity of transmit radio frequency channels on a transmit end, $N_{Tx}$ represents a quantity of transmit antennas on the transmit end, and $M_{TXRU} \leq N_{Tx}$. $C_2$ may be the second-level precoding matrix, and may be specifically an $M_{TXRU} \times S$ matrix, where $S$ represents a quantity of data streams on which third-level precoding processing is performed, and $S \leq M_{TXRU}$. $W$ may be the third-level precoding matrix, and may be specifically an $S \times K$ matrix, where $K$ is a quantity of streams in data transmission, or may be a quantity of data streams obtained after layer mapping is performed, and $K \leq S$.

As shown in FIG. 5, during data transmission, output of third-level precoding is coupled to input of second-level precoding, output of the second-level precoding is coupled to input of a radio frequency channel, output of the radio frequency channel is coupled to input of first-level precoding, and output of the first-level precoding is coupled to an antenna.

The first-level precoding shown in FIG. 5 may be analog. In an analog precoding technology, precoding is implemented on a radio frequency front end, beamforming is implemented on an analog signal in the analog precoding technology, and a phase of a signal is changed by using a phase-shift network technology, to implement different weighting.

Virtual sector division is implemented by using the first-level precoding $C_1$. $C_1$ may be used to indicate information about a virtual sector, for example, used to indicate a direction of one or more (≤$M_{TXRU}$) virtual sectors. A group of beams, for example, beams designed based on a channel correlation matrix, may be designed in advance, and each beam forms a virtual sector. A terminal device measures receive power corresponding to each beam, and selects a beam with maximum receive power. The terminal device may send beam information to the base station, for example, a sequence number of the beam. The base station determines the first-level precoding $C_1$ based on the selected beam.

The virtual sector may be implemented through analog beamforming (ABF). FIG. 6 shows first analog beamforming ABF 1 and second analog beamforming ABF 2. Certainly, there may be more ABF, which is not shown in detail in FIG. 6. Each ABF may be corresponding to one first-level precoding matrix $C_1$.

In an implementation form, the first-level precoding may be implemented by using a phase-shift network. The phase-shift network may include a plurality of current dividers 501, a plurality of phase shifters 503, and a plurality of combiners 505. In FIG. 5, each radio frequency channel is connected to all antennas by using the first-level precoding, and a signal sent by each antenna is a weighted sum of data from all radio frequency channels. Therefore, a structure shown in FIG. 5 may also be referred to as a fully-connected structure. In FIG. 5, a dimension of the phase-shift network is $M_{TXRU} \times N_{TX}$.

A structure form of the first-level precoding $C_1$ may be:

$$C_1=[v_1,v_2,\ldots,v_S].$$

$v_1$ to $v_S$ each are an N×1 vector, and each vector is corresponding to a weighting factor used for mapping each radio frequency channel in the phase-shift network to all transmit antennas.

The second-level precoding $C_2$ may be digital. The second-level precoding may be used for spatial dimension reduction of the virtual sector, and is particularly applicable to a scenario of a relatively large quantity of transmit radio frequency channels (Transmit Radio Unit, TXRU). $C_2$ may be used to indicate information about the spatial dimension reduction of the virtual sector.

As shown in FIG. 6, for each virtual sector, a spatial dimension may be reduced by using the second-level precoding. dynamic spatial dimension reduction (DSDR) beamforming may be implemented by using the second-level precoding, and S main user directions within a service range of the virtual sector may further be dynamically addressed. The second-level precoding $C_2$ may be obtained based on long-term wideband channel statistics information of the terminal device served by the base station. The DSDR beamforming implemented by using the second-level precoding changes relatively slowly, and may be applicable to space directions of different users. How to determine the second-level precoding matrix is further described below.

Because a spatial dimension is reduced, pilot and channel feedback overheads can be reduced, and baseband processing complexity and radio frequency processing complexity are also reduced.

The third-level precoding W may be digital. Multi-user interference suppression may be implemented by using the third-level precoding W. W may be used to indicate precoding information of the multi-user interference suppression. User-level spatial multiplexing in a virtual sector may be implemented by using the third-level precoding. The third-level precoding matrix may be determined according to the 3GPP (3rd Generation Partnership Project) standard. A difference is that a channel in the current standard needs to be replaced with an equivalent user channel $\tilde{H}=H_{(k,i)}C_1C_2$.

In an implementable solution, W may be obtained by using a zero-forcing precoding algorithm:

$$W=\tilde{H}^H(\tilde{H}\tilde{H}^H)^{-1}.$$

The third-level precoding matrix W provided in this embodiment of this patent application may be corresponding to $W_2$ in a double codebook structure $W=W_1W_2$ introduced into LTE-Advanced.

In $W=W_1W_2$, $W_1$ is a long-term and/or wideband codebook, and is used to represent, for example, a channel environment of entire system bandwidth. The channel environment changes relatively slowly, and may have an extremely long feedback period. $W_2$ is a short-term and/or narrowband codebook, is used to represent, for example, a channel environment in a sub-band. The channel environment changes relatively fast, and has an extremely short feedback period.

It is assumed that the base station has NTx transmit antennas and S (S≤NTx) transmit radio frequency channels, a three-level precoding solution is used, and a data precoding process is as follows: K data streams obtained after layer mapping is performed are first processed by using the third-level precoding, for example, the K data streams are multiplied by the third-level precoding matrix, to generate S (K≤S) data streams. The K data streams may be K baseband digital signal flows. The S data streams are then processed by using the second-level precoding. For example, the S data streams are multiplied by the second-level precoding matrix, to generate $M_{TXRU}$ (S≤$M_{TXRU}$) data streams. The $M_{TXRU}$ data streams are converted from frequency domain to time domain through inverse discrete Fourier transform, and are respectively sent to $M_{TXRU}$ radio frequency channels, and converted into $M_{TXRU}$ analog data streams. The $M_{TXRU}$ analog data streams are processed by using the first-level precoding, to generate NTx transmit data streams, and the NTx transmit data streams are respectively transmitted by using NTx antennas.

In a three-level precoding architecture, this patent application proposes a channel state information feedback method. The method includes the following steps.

The base station sends a reference signal to the terminal device, and the terminal device receives the reference signal sent by the base station. The reference signal may be a channel state information-reference signal (CSI-RS for short). The terminal device determines channel state information based on the reference signal. The terminal device sends the channel state information to the base station, and the base station receives the channel state information. The base station determines a precoding matrix F based on the channel state information.

The precoding matrix $F=C_1C_2W$, where $C_1$ is a first-level precoding matrix, $C_2$ is a second-level precoding matrix, and W is a third-level precoding matrix. Channel state information corresponding to $C_1$ includes beam information, channel state information corresponding to $C_2$ includes long-term wideband channel information, and channel state information corresponding to W includes instantaneous channel information.

Figure 7:
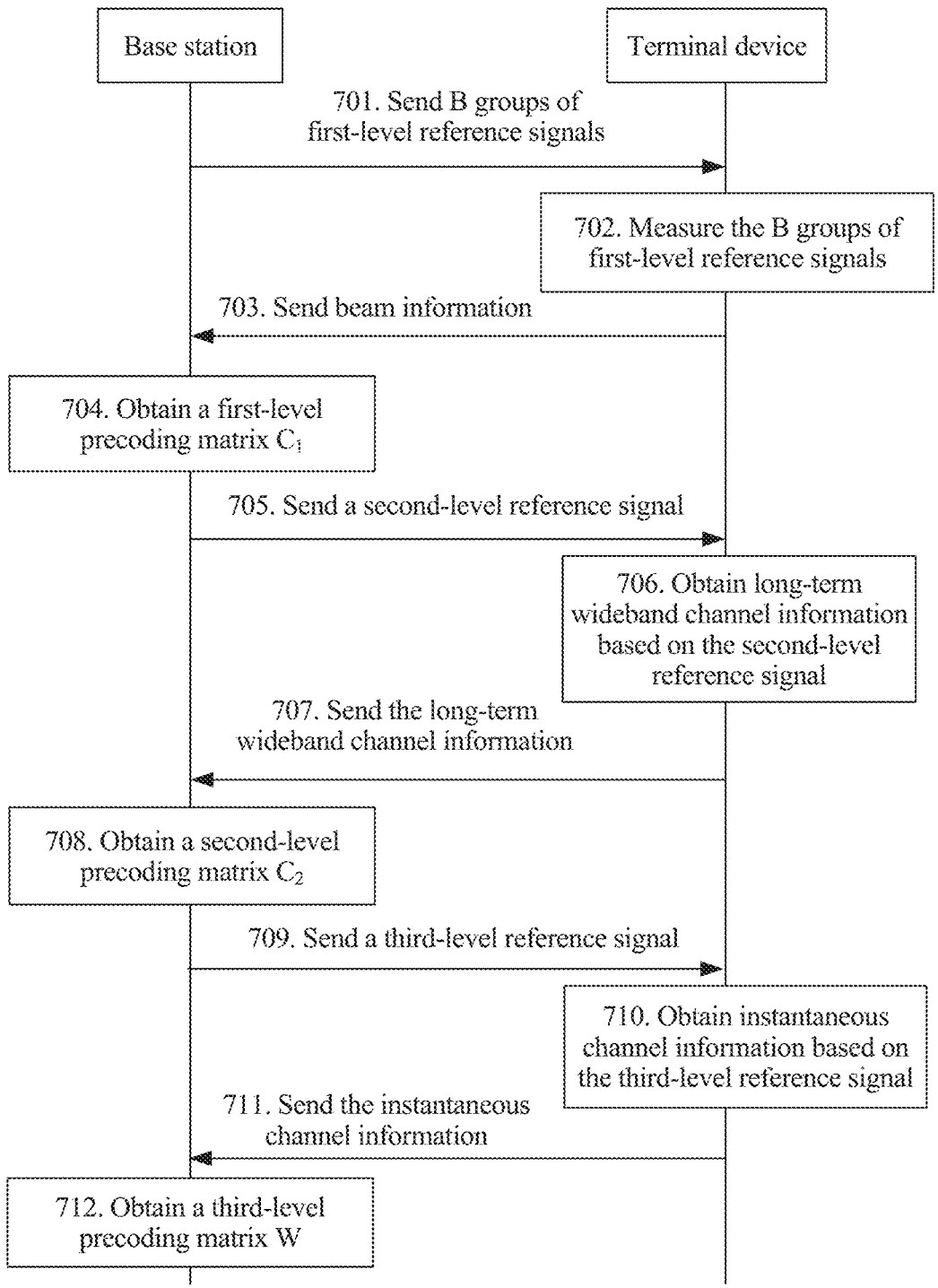
FIG. 7 is a schematic interaction diagram of a channel state information feedback method according to an embodiment of this patent application.

FIG. 7 is a schematic interaction diagram of a channel state information feedback method according to an embodiment of this patent application. As shown in FIG. 7, the method includes the following steps.

701. A base station sends B groups of first-level reference signals to a terminal device. User equipment receives the B groups of first-level reference signals sent by the base station. The first-level reference signal may be a first-level CSI-RS. B is a quantity of beams of the base station, and may be designed in advance. A quantity of antenna ports corresponding to the first-level CSI-RS sent by the base station is $M_{TXRU}$. The antenna port is a logical port used for transmission, and may be not in a one-to-one correspondence with a physical antenna.

702. The terminal device measures receive power corresponding to the B groups of CSI-RSs, and determines a beam corresponding to a group of first-level reference signals with maximum receive power. The beam may indicate information about a virtual sector of the base station.

703. The terminal device sends first-level CSI feedback information to the base station. The first-level CSI feedback information may be determined beam information. The base station receives the beam information determined by the terminal device. The beam information may be represented by a sequence number of the beam. Overheads of sending the sequence number of the beam by the terminal device are log 2(B) bits.

704. The base station determines, based on the sequence number of the beam, a first-level precoding matrix $C_1$ corresponding to the sequence number of the beam. $C_1$ is an $N_{Tx} \times M_{TXRU}$ matrix, where $M_{TXRU}$ represents a quantity of transmit radio frequency channels of the base station, $N_{Tx}$ represents a quantity of transmit antennas of the base station, and $M_{TXRU} \leq N_{Tx}$.

705. The base station sends a second-level reference signal to the terminal device. The second-level reference signal may be a second-level CSI-RS. A beam used by the base station to send the second-level reference signal may be determined by using step 702. A quantity of antenna ports corresponding to the second-level CSI-RS sent by the base station is $M_{TXRU}$. The terminal device receives the second-level reference signal sent by the base station. Specifically, the terminal device may receive, within a range of a virtual sector determined based on a sequence number of the beam, the second-level reference signal sent by the base station.

706. The terminal device performs channel estimation based on the received second-level reference signal, to obtain long-term wideband channel information. The long-term wideband channel information may include information about a channel space correlation matrix $R_k$. The information about the channel space correlation matrix $R_k$ may be the channel space correlation matrix $R_k$, or a strongest group of eigenvectors (first S eigenvectors with a maximum corresponding eigenvalue) of the channel space correlation matrix $R_k$, or a strongest group of eigenvalues and eigenvectors of the channel space correlation matrix $R_k$. Long-term means a relatively long feedback interval.

When the terminal device performs channel estimation based on the second-level reference signal, it is assumed that a quantity of receive antennas of a terminal device k is $N_{Rx}$, a channel of the terminal device k on an $i^{th}$ subcarrier is $H(k, i)$, and $H(k, i)$ is an $N_{Rx} \times N_{Tx}$ matrix. If first-level precoding fed back by the terminal device k is $C(1, k)$, an equivalent channel is $\overline{H}_{(k,i)} = H(k, i)C(1, k)$, and the equivalent channel $\overline{H}_{(k,i)}$ is an $N_{Rx} \times M_{TXRU}$ matrix. Therefore, a channel space correlation matrix of the terminal device k is:

$$R_k = \sum_i (\overline{H}_{(k,i)}^H \overline{H}_{(k,i)}).$$

$R_k$ is an $M_{TXRU} \times M_{TXRU}$ matrix.

707. The terminal device sends second-level CSI feedback information to the base station. The second-level CSI feedback information may be long-term wideband channel information. The base station receives the long-term wideband channel information sent by the terminal device.

708. The base station obtains a second-level precoding matrix $C_2$ of a terminal device k after performing processing based on beam information and long-term wideband channel information reported by all terminal devices. $C_2$ is an $M_{TXRU} \times S$ matrix, and $S \leq M_{TXRU}$. Channel space may be reduced from $M_{TXRU}$ dimensions to S dimensions by using the second-level precoding matrix $C_2$.

The second-level precoding matrix $C_2$ may be obtained through calculation based on long-term wideband channel information of all terminal devices in the virtual sector according to a specific criterion. The criterion may include but is not limited to a maximum channel capacity criterion, a minimum mean square error criterion, or a minimum singular value criterion.

The maximum channel capacity criterion is used as an example for description, and the base station performs weighting on channel space correlation matrices fed back by all the terminal devices, to obtain $$\hat{R} = \sum_k R_k / \|R_k\|.$$

$\hat{R}$ is an $M_{TXRU} \times M_{TXRU}$ matrix, and $\|R_k\|$ is a Frobenius norm of $R_k$. $\hat{R}$ may be a Hermitian matrix, and eigenvalue decomposition is performed on $\hat{R}$, to obtain $$\hat{R} = U \Lambda U^H.$$

U is an $M_{TXRU} \times M_{TXRU}$ unitary matrix, and $\Lambda$ is an $M_{TXRU} \times M_{TXRU}$ diagonal matrix whose eigenvalues are arranged in descending order. According to a capacity maximization principle, C2 includes S columns (eigenvectors) of a maximum eigenvalue corresponding to U, namely:

$$C_2 = U(:, 1:S).$$

The first ":" in the formula indicates that all data of each column is selected, for example, if U has m rows, a column vector selected for $C_2$ also has m rows. "1:S" in a latter part of the formula indicates that a first to an $S^{th}$ columns of the matrix $C_2$ are selected.

It can be learned that $C_2$ is equal to a matrix including a first to an $S^{th}$ columns of column vectors of U. $C_2$ is an $M_{TXRU} \times S$ matrix, and $S \leq M_{TXRU}$.

709. The base station sends a third-level reference signal to the terminal device. The third-level reference signal may be a third-level CSI-RS. A beam of the third-level reference signal sent by the base station is corresponding to the first-level precoding matrix $C_1$ and the second-level precoding matrix $C_2$. To be specific, the base station sends, in a virtual sector on which spatial dimension reduction is performed, the third-level reference signal to the terminal device. A quantity of antenna ports corresponding to the third-level CSI-RS sent by the base station is S. The terminal device receives, in the virtual sector on which spatial dimension reduction is performed, the user-specific third-level reference signal sent by the base station.

710. The terminal device performs channel estimation based on the received third-level reference signal, to obtain instantaneous channel information. The instantaneous channel information may be instantaneous narrowband channel information.

In one case, the instantaneous channel information may include an instantaneous channel space correlation matrix. In one case, the instantaneous channel information may include a third-level precoding matrix indicator (PMI). In another case, the instantaneous channel information may include a rank indicator (RI) and a channel quality indicator (CQI).

711. The terminal device sends third-level CSI feedback information to the base station. The third-level CSI feedback information may be the instantaneous channel information, and the base station receives the instantaneous channel information sent by the terminal device.

712. The base station obtains third-level precoding W after performing processing based on the instantaneous channel information of the terminal device.

The third-level precoding W may be $W=\tilde{H}^H(\tilde{H}\tilde{H}^H)^{-1}$.

$\tilde{H}$ is an equivalent user channel, and $\tilde{H}=H_{(k,i)}C_1C_2$. $\tilde{H}$ is an $N_{Rx} \times S$ matrix.

After a three-level precoding matrix is determined, the base station may use the three-level precoding matrix to perform data transmission with the terminal device.

Figure 8:
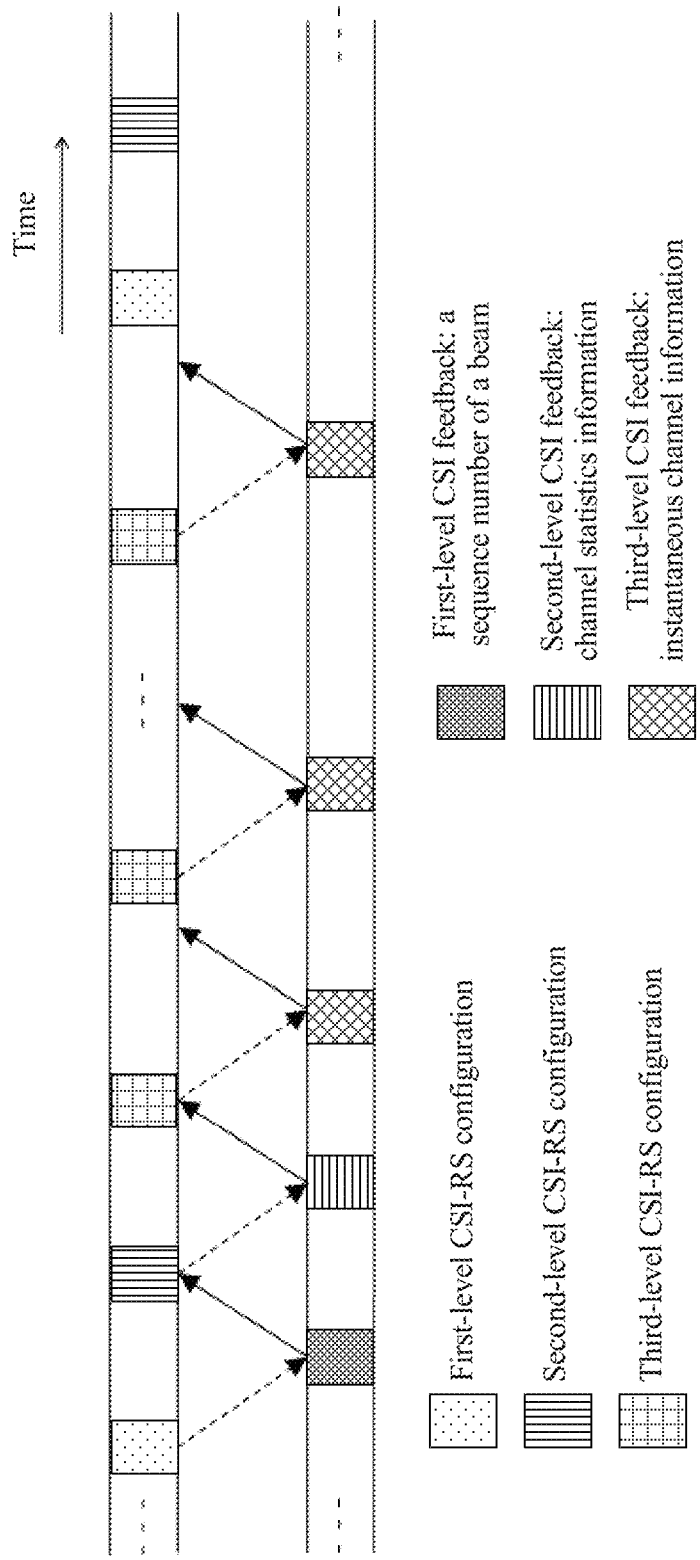
FIG. 8 is a schematic diagram of configuration and feedback of a three-level CSI-RS according to another embodiment of this patent application.

FIG. 8 is a schematic diagram of configuration and feedback of a three-level CSI-RS according to another embodiment of this patent application. As shown in FIG. 8, a base station sends first-level CSI-RS configuration information to a terminal device, and the terminal device processes the first-level CSI-RS configuration information, and then sends first-level CSI feedback information to the base station. The first-level CSI feedback information may be a sequence number of a beam. The base station then sends second-level CSI-RS configuration information to the terminal device, and the terminal device processes the second-level CSI-RS configuration information, and then sends second-level CSI feedback information to the base station. The second-level CSI feedback information may be channel statistics information. The channel statistics information is obtained by the terminal device by performing long-term channel space correlation statistics collection, or may be long-term wideband channel information. The base station then sends third-level CSI-RS configuration information to the terminal device, and the terminal device processes the third-level CSI-RS configuration information, and then sends third-level CSI feedback information to the base station. The third-level CSI feedback information may be instantaneous channel information.

As shown in FIG. 8, a time period T1 of sending the first-level CSI-RS configuration information by the base station is greater than or equal to a time period T2 of sending the second-level CSI-RS configuration information by the base station. The time period T2 of sending the second-level CSI-RS configuration information by the base station is greater than a time period T3 of sending the third-level CSI-RS configuration information by the base station.

Channel space may be reduced from $M_{TXRU}$ dimensions to S dimensions by using a second-level precoding matrix $C_2$. Correspondingly, a quantity of antenna ports used by the base station to send a third-level reference signal to the terminal device is reduced from $M_{TXRU}$ to S. A quantity of antenna ports used by the terminal device to feed back the instantaneous channel information to the base station is accordingly reduced. The base station extremely frequently sends the third-level reference signal to the terminal device, and the terminal device extremely frequently feeds back the instantaneous channel message, so that channel information feedback overheads can be greatly reduced.

Figure 9:
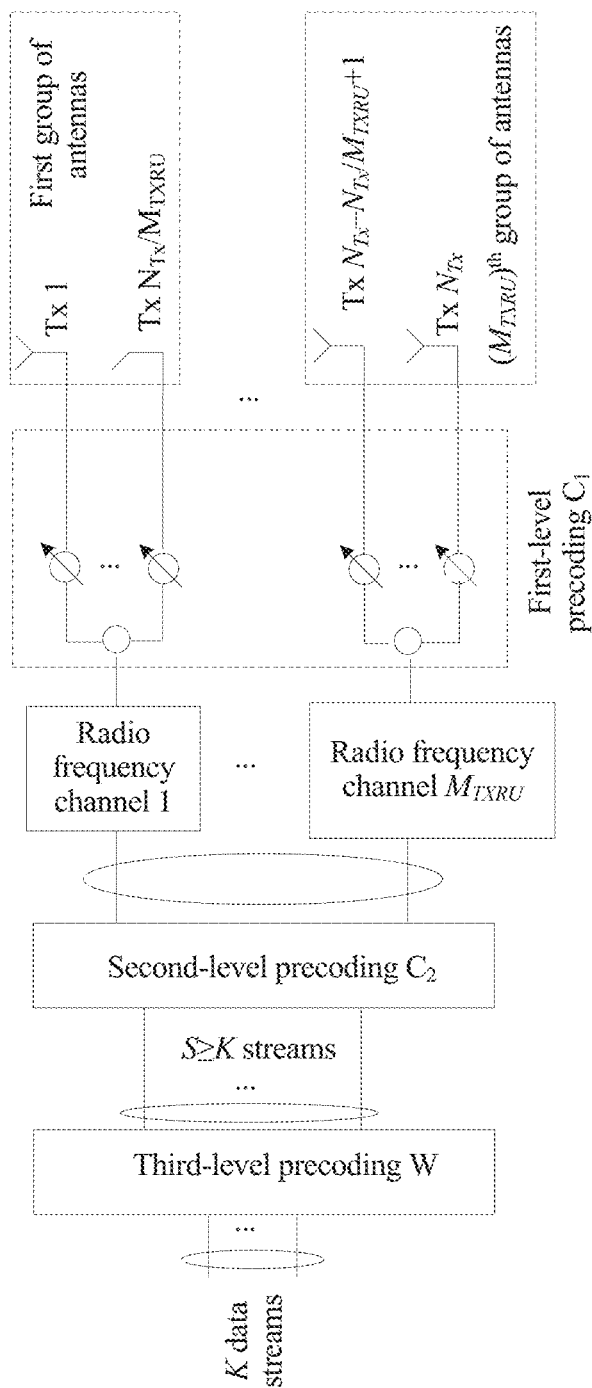
FIG. 9 is a schematic structural diagram of three-level precoding according to another embodiment of this patent application.

FIG. 9 is a schematic structural diagram of three-level precoding according to another embodiment of this patent application. A main difference between FIG. 9 and FIG. 5 lies in an implementation structure of first-level precoding. In FIG. 9, transmit antennas are classified into $M_{TXRU}$ groups, and each group of antennas is connected to only one radio frequency channel. A structure shown in FIG. 9 may also be referred to as a semi-connected structure. In an architecture shown in FIG. 9, a used channel state information feedback method is basically the same as the channel state information feedback method shown in FIG. 5, and details are not described herein again.

In the architecture shown in FIG. 9, $C_1$ is a block diagonal matrix, and is of the following form:

$$C_1 = \begin{bmatrix} v_1 & & & \\ & v_2 & & \\ & & \ddots & \\ & & & v_S \end{bmatrix}.$$

$v_1$ to $v_S$ each are an N/S×1 vector. When $v_1$ to $v_S$ each are an N×1 vector, each vector is corresponding to a weighting factor used for mapping each radio frequency channel in a phase-shift network to each corresponding group of transmit antennas.

When there are a relatively small quantity of TXRUs, spatial dimension reduction is not required. In this case, C2 in a formula $F=C_1C_2W$ is equal to I, I is an identity matrix, and $M_{TXRU}=S$. In this case, $F=C_1W$. For $C_1$ and W, refer to the foregoing descriptions, or refer to the following descriptions. Correspondingly, another simplified three-level precoding solution is obtained, or may be referred to as a first type of two-level precoding solution.

Figure 10:
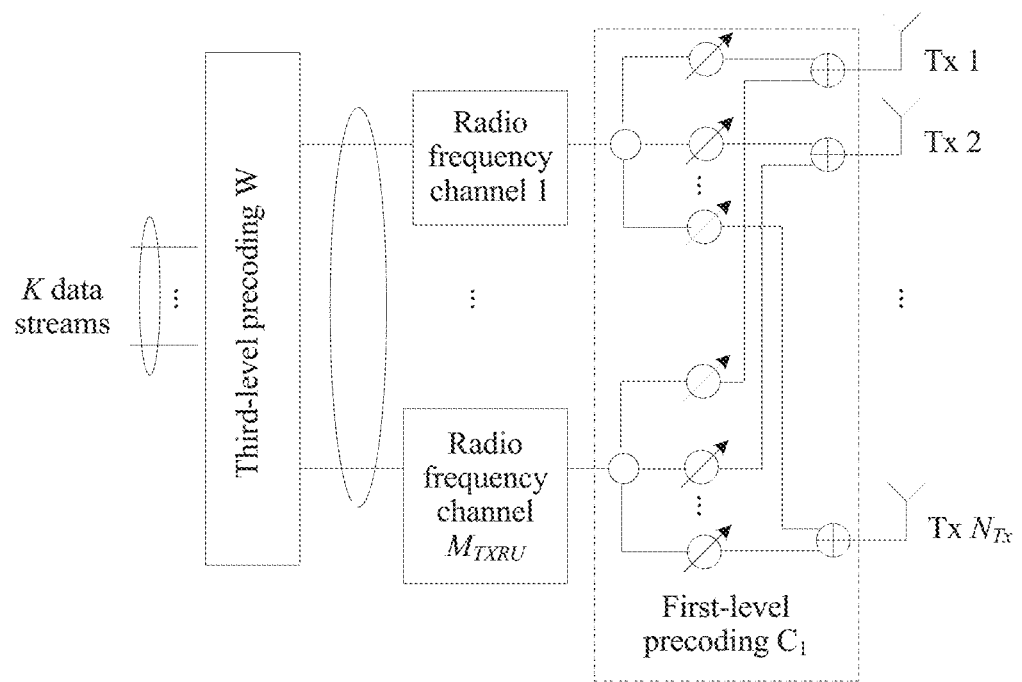
FIG. 10 is a schematic structural diagram of two-level precoding according to another embodiment of this patent application.

FIG. 10 is a schematic structural diagram of two-level precoding according to another embodiment of this patent application. A structure shown in FIG. 10 may also be referred to as a fully-connected structure. As shown in FIG. 10, output of third-level precoding is coupled to input of a radio frequency channel, output of the radio frequency channel is coupled to input of first-level precoding, and output of the first-level precoding is coupled to an antenna.

As shown in FIG. 10, it is assumed that a base station has NTx transmit antennas and S (S≤NTx) transmit radio frequency channels. K data streams are first processed by using the third-level precoding, to generate S data streams. The S data streams are converted from frequency domain to time domain through discrete Fourier transform, and are respectively sent to S radio frequency channels, and converted into S analog data streams. The S analog data streams are processed by using the first-level precoding, to generate NTx transmit data streams, and the NTx transmit data streams are respectively transmitted by using NTx antennas. The third-level precoding is implemented on a subcarrier in frequency domain. Therefore, different subcarriers may be weighted and combined by using different weighted matrices, and therefore the third-level precoding is performed on a narrowband. The first-level precoding is performed in time domain, and therefore the first-level precoding is performed on a wideband, to be specific, a same analog precoding matrix is used for data on all subcarriers.

A receive signal of a user on an $i^{th}$ subcarrier may be represented as:

$$y_i = H_i CW_i x_i + n_i.$$

$x_i$ is an information vector sent by K users on a $w^{th}$ subcarrier, $y_i$ is an information vector received by the K users on the $i^{th}$ subcarrier, $H_i$ is a channel matrix of the K users on the $i^{th}$ subcarrier, and $n_i$ is white Gaussian noise.

A structure form of the first-level precoding $C_1$ may be:

$$C_1=[v_1, v_2, \ldots, v_S].$$

$v_1$ to $v_S$ each are an N×1 vector, and each vector is corresponding to a weighting factor used for mapping each radio frequency channel in a phase-shift network to all transmit antennas. Any element of $C_1$ may be non-zero.

Figure 11:
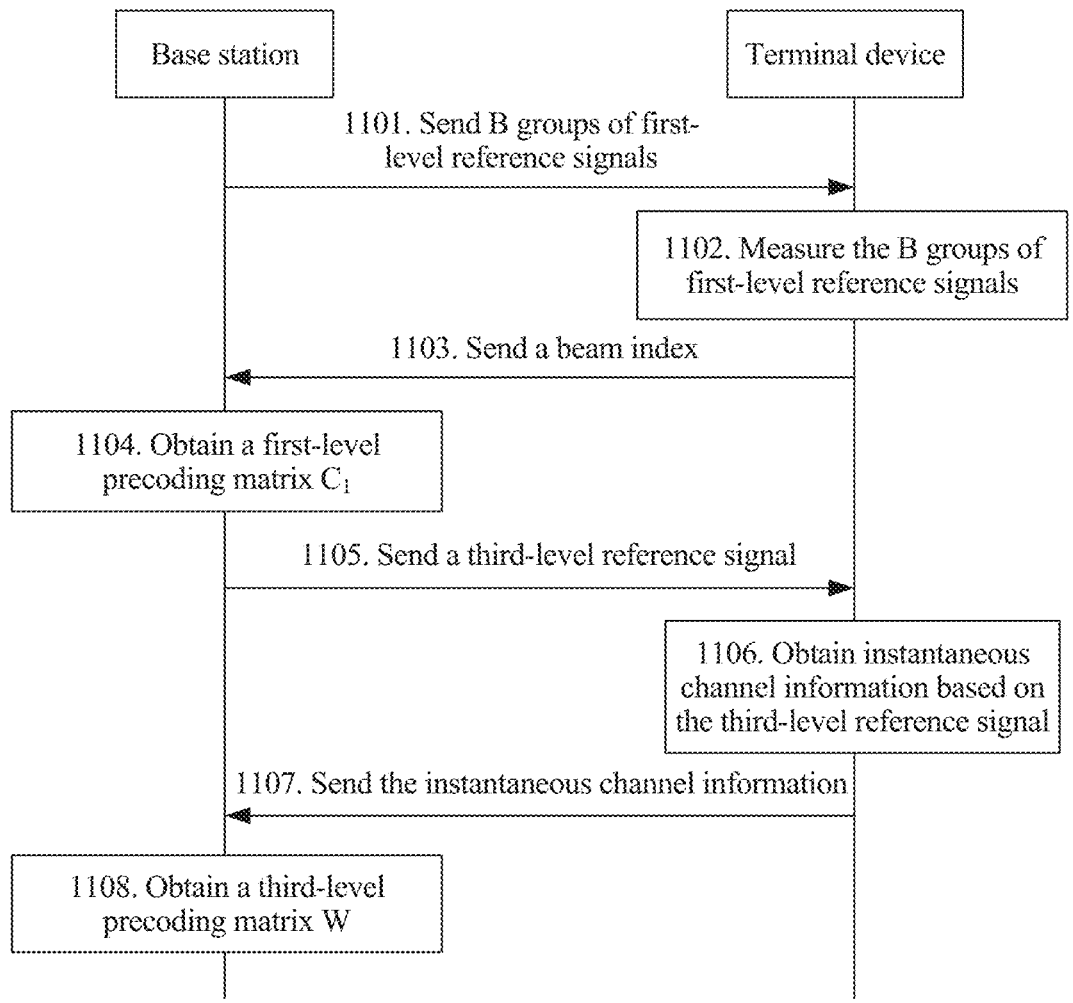
FIG. 11 is a schematic interaction diagram of a channel state information feedback method according to an embodiment of this patent application.

FIG. 11 is a schematic interaction diagram of a channel state information feedback method according to an embodiment of this patent application. As shown in FIG. 11, the method includes the following steps.

Steps 1101 to 1104 are basically the same as steps 701 to 704.

1105. The base station sends a third-level reference signal to the terminal device. The third-level reference signal may be a third-level CSI-RS. A beam used by the base station to send the third-level reference signal is corresponding to the first-level precoding matrix $C_1$. To be specific, the base station sends the third-level reference signal to the terminal device within a range of the virtual sector. A quantity of antenna ports corresponding to the third-level CSI-RS sent by the base station is S. The terminal device receives, in the virtual sector, the user-specific third-level CSI-RS sent by the base station.

Steps 1106 and 1107 are basically the same as steps 710 and 711.

1108. The base station obtains third-level precoding W after performing processing based on the instantaneous channel information of the terminal device.

The third-level precoding W may be $W=\tilde{H}^H(\tilde{H}\tilde{H}^H)^{-1}$.

$\tilde{H}$ is an equivalent user channel, and $\tilde{H}=H_{(k,i)}C_1$. $\tilde{H}$ is an $N_{Rx} \times S$ matrix.

Figure 12:
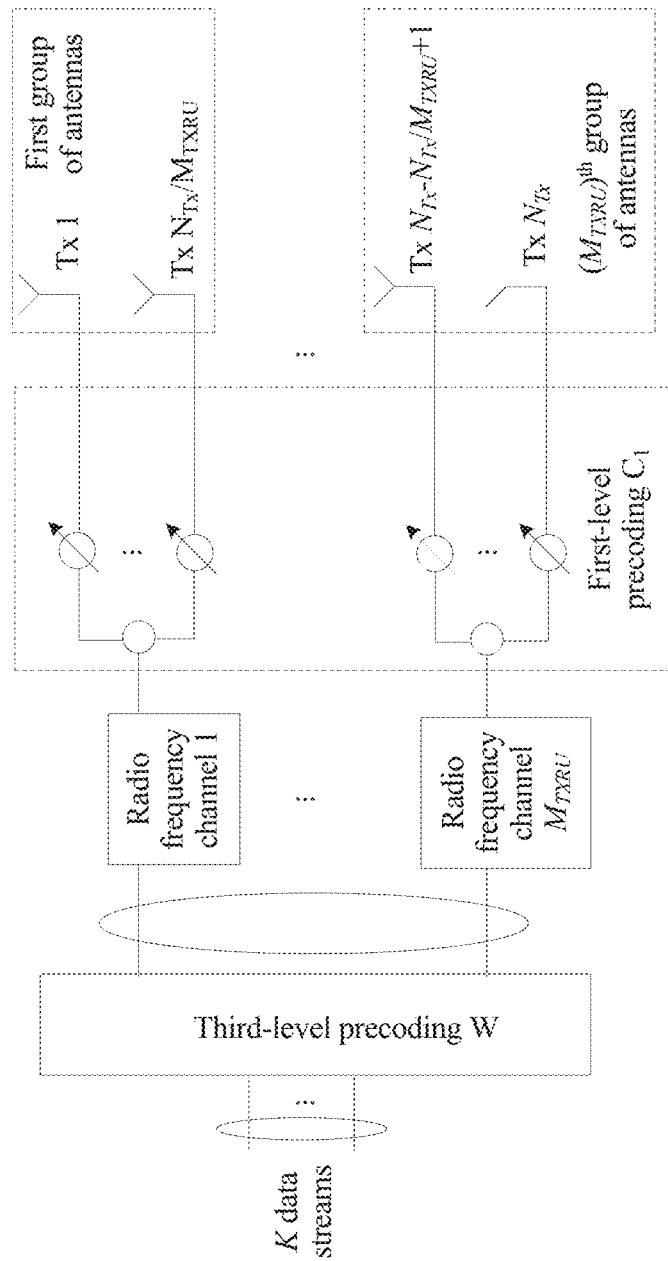
FIG. 12 is a schematic structural diagram of two-level precoding according to another embodiment of this patent application.

FIG. 12 is a schematic structural diagram of two-level precoding according to another embodiment of this patent application. A main difference between FIG. 12 and FIG. 10 lies in an implementation structure of first-level precoding. In FIG. 12, transmit antennas are classified into $M_{TXRU}$ groups, and each group of antennas is connected to only one radio frequency channel. Therefore, a total of $M_{TXRU} 1 \times N_{Tx}/M_{TXRU}$ phase-shift networks are required.

A structure shown in FIG. 12 may also be referred to as a semi-connected structure. In an architecture shown in FIG. 12, a used channel state information feedback method is basically the same as the channel state information feedback method shown in FIG. 10, and details are not described herein again.

When a quantity of TXRUs is the same as a quantity of antennas, C1 in a formula $F=C_1C_2W$ is equal to I, I is an identity matrix, and $N_{Tx}=M_{TXRU}$. When there are a relatively large quantity of antennas, spatial dimension reduction is required. In this case, $F=C_2W$. For $C_2$ and W, refer to the foregoing descriptions. Alternatively, all terminal devices served by the base station are located in a same virtual sector, and in this case, $F=C_2W$ is also applicable. Correspondingly, another simplified three-level precoding solution is obtained, or may be referred to as a second type of two-level precoding solution.

Figure 13:
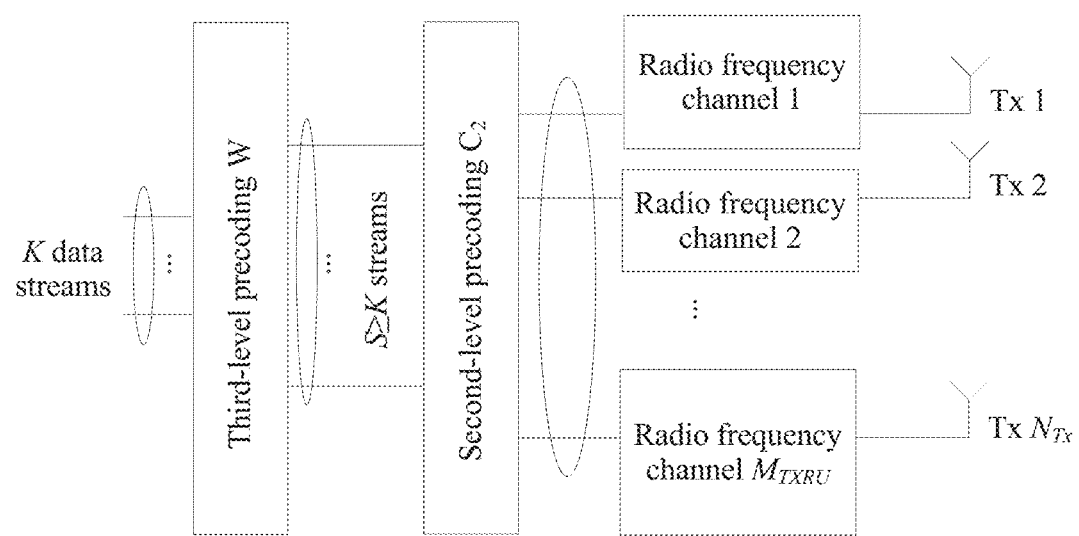
FIG. 13 is a schematic structural diagram of two-level precoding according to another embodiment of this patent application.

FIG. 13 is a schematic structural diagram of two-level precoding according to another embodiment of this patent application. As shown in FIG. 13, output of third-level precoding is coupled to input of second-level precoding, output of the second-level precoding is coupled to input of a radio frequency channel, and output of the radio frequency channel is coupled to an antenna. Space division may be implemented by using the second-level precoding, and S main user directions within a service range of the base station may be adaptively addressed.

As shown in FIG. 13, it is assumed that a base station has NTx transmit antennas and S (S≤NTx) transmit radio frequency channels. K data streams are first processed by using the third-level precoding, for example, the K data streams are multiplied by a third-level precoding matrix, to generate S (K≤S) data streams. The K data streams may be K baseband digital signal flows. The S data streams are then processed by using the second-level precoding. For example, the S data streams are multiplied by the second-level precoding matrix, to generate $M_{TXRU}$ (S≤$M_{TXRU}$) data streams. The $M_{TXRU}$ data streams are converted from frequency domain to time domain through inverse discrete Fourier transform, and are respectively sent to $M_{TXRU}$ radio frequency channels, and converted into $M_{TXRU}$ analog data streams. The $M_{TXRU}$ analog data streams are respectively transmitted by using NTx antennas.

Figure 14:
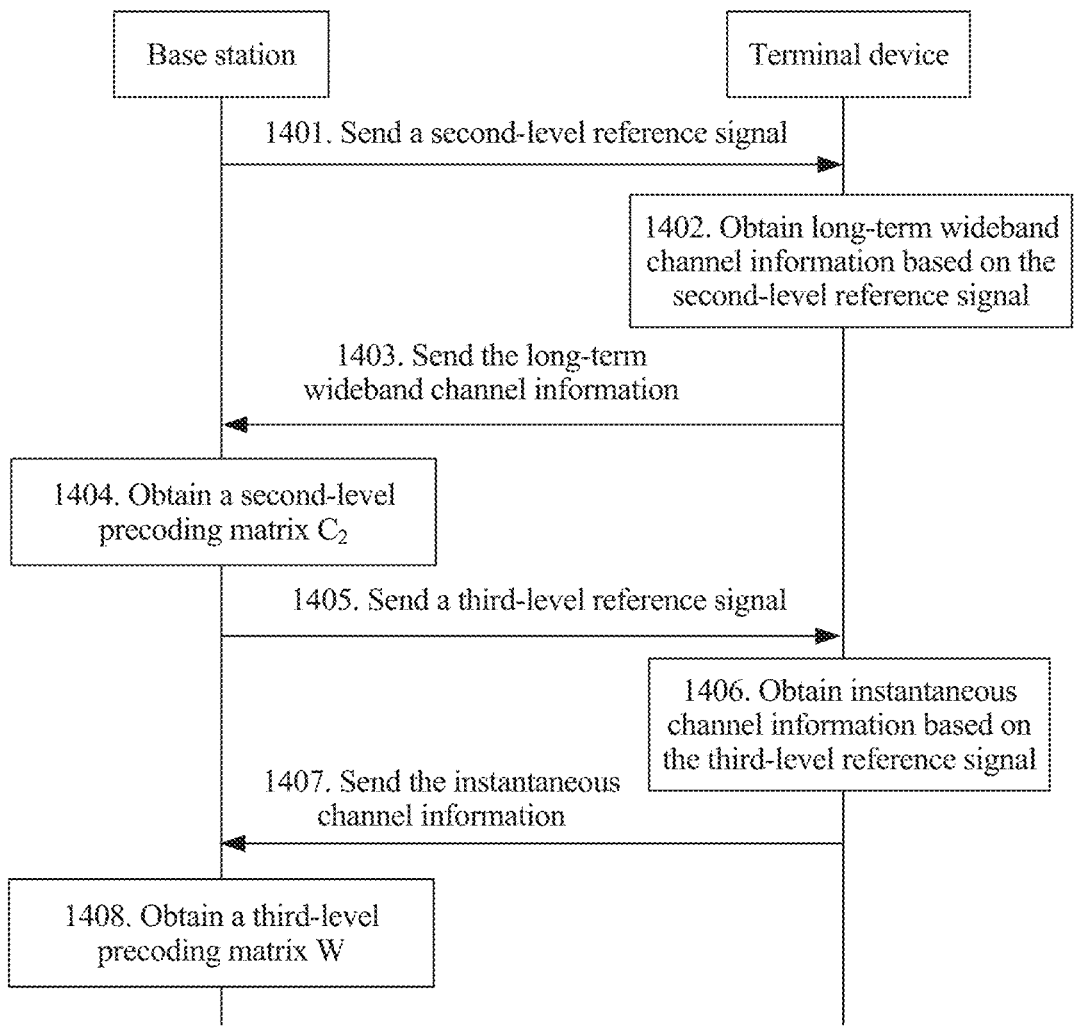
FIG. 14 is a schematic interaction diagram of a channel state information feedback method according to an embodiment of this patent application.

FIG. 14 is a schematic interaction diagram of a channel state information feedback method according to an embodiment of this patent application. As shown in FIG. 14, the method includes the following steps.

1401. A base station sends a second-level reference signal to a terminal device. The second-level reference signal may be a second-level CSI-RS. A quantity of antenna ports (ports) corresponding to the second-level CSI-RS sent by the base station is $M_{TXRU}$. The terminal device receives the second-level reference signal sent by the base station.

1402. The terminal device performs channel estimation based on the received second-level reference signal, to obtain long-term wideband channel information. For the long-term wideband channel information, refer to the foregoing descriptions.

Specifically, the terminal device performs channel estimation based on the second-level reference signal, and it is assumed that a quantity of receive antennas of the terminal device is $N_{Rx}$, a channel of the terminal device on an $i^{th}$ subcarrier is H(k, i), and H(k, i) is an $N_{Rx} \times N_{Tx}$ matrix. A channel space correlation matrix of a terminal device k is:

$$R_k = \sum_i (H_{(k,i)}^H H_{(k,i)}).$$

Steps 1403 and 1404 are basically the same as steps 707 and 708. A main difference lies in that the second-level precoding matrix C2 is obtained through calculation based on long-term wideband channel information of all terminal devices according to a specific criterion, instead of long-term wideband channel information of all terminal devices in a virtual sector.

1405. The base station sends a third-level reference signal to the terminal device. The third-level reference signal may be a third-level CSI-RS. A beam used by the base station to send the third-level reference signal is corresponding to the second-level precoding matrix $C_2$. A quantity of antenna ports corresponding to the third-level CSI-RS sent by the base station is S. The terminal device receives, in a virtual sector on which spatial dimension reduction is performed, the user-specific third-level reference signal sent by the base station.

Steps 1406 and 1407 are basically the same as steps 710 and 711.

1408. The base station obtains third-level precoding W after performing processing based on the instantaneous channel information of the terminal device.

The third-level precoding W may be $W=\tilde{H}^H(\tilde{H}\tilde{H}^H)^{-1}$.

$\tilde{H}$ is an equivalent user channel, and $\tilde{H}=H_{(k,t)}C_2$. $\tilde{H}$ is an $N_{Rx} \times S$ matrix.

Figure 15:
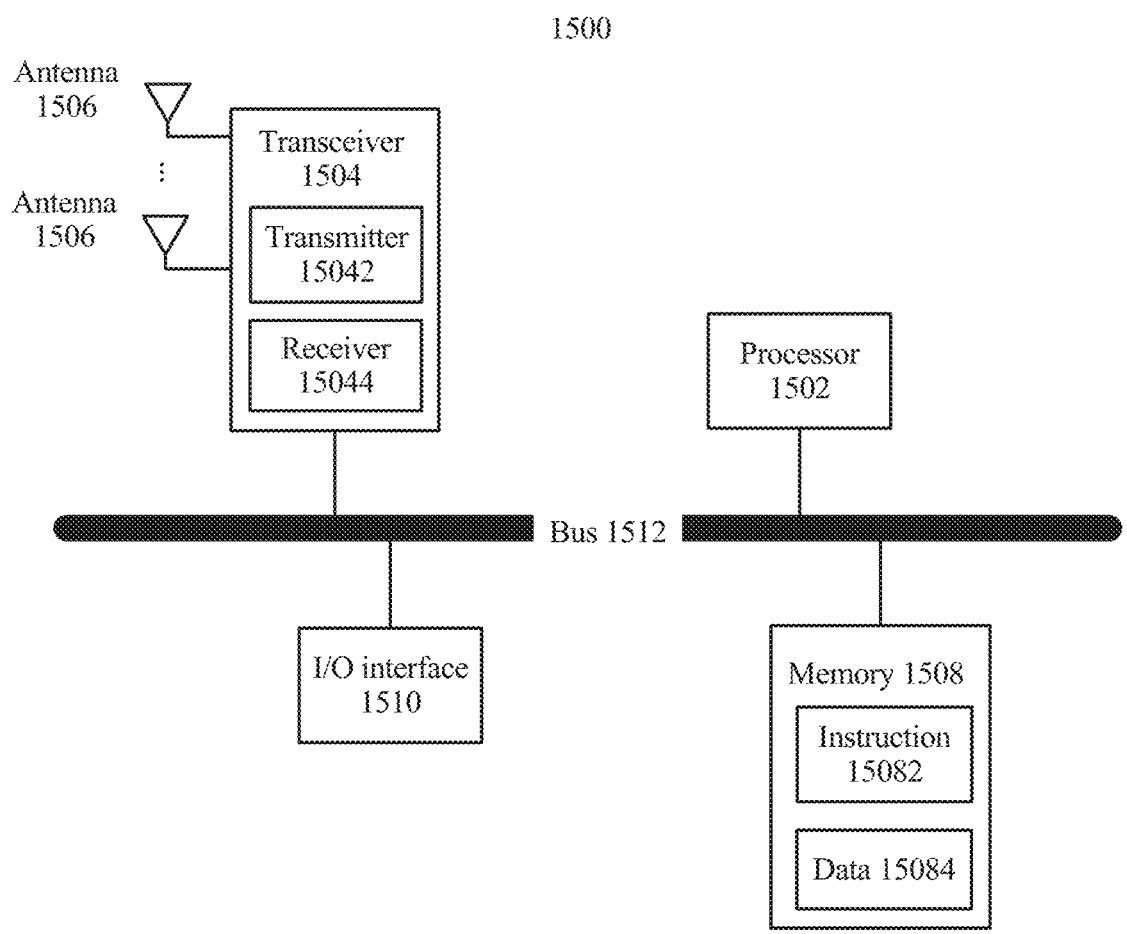
FIG. 15 is a schematic diagram of a hardware structure of a terminal device according to an embodiment of this patent application.

FIG. 15 is a schematic diagram of a hardware structure of a terminal device 1500 according to an embodiment of this patent application. As shown in FIG. 15, the terminal device 1500 includes a processor 1502, a transceiver 1504, a plurality of antennas 1506, a memory 15015, and an input/output (I/O) interface 1510. The transceiver 1504 further includes a transmitter 15042 and a receiver 15044, and the memory 15015 is further configured to store an instruction 15082 and data 15084. In addition, the terminal device 1500 may further include a bus 1512. The processor 1502, the transceiver 1504, the memory 15015, and the I/O interface 1510 are communicatively connected to each other by using the bus 1512, and the plurality of antennas 1506 are connected to the transceiver 1504.

The processor 1502 may be a general purpose processor, by way of example but not limitation, a central processing unit (CPU), or may be a dedicated processor, by way of example but not limitation, a digital signal processor (DSP), an application-specific integrated circuit (ASIC), or a field programmable gate array (FPGA). In addition, the processor 1502 may alternatively be a combination of a plurality of processors. The processor 1502 is configured to perform steps 702, 706, and 710 in the method shown in FIG. 7. Alternatively, the processor 1502 is configured to perform steps 1102 and 1106 in the method shown in FIG. 11. Alternatively, the processor 1502 is configured to perform steps 1402 and 1406 in the method shown in FIG. 14. The processor 1502 may be a processor particularly designed to perform the foregoing operations and/or steps, or may perform the foregoing operations and/or steps by reading and executing the instruction 15082 stored in the memory 15015. The processor 1502 may need to use the data 15084 when performing the foregoing operations and/or steps.

The transceiver 1504 includes the transmitter 15042 and the receiver 15044. The transmitter 15042 is configured to send an uplink signal to a base station by using at least one of the plurality of antennas 1506. The receiver 15044 is configured to receive a downlink signal from the base station by using at least one of the plurality of antennas 1506. The transmitter 15042 is specifically configured to: perform, by using at least one of the plurality of antennas 1506, steps 703, 707, and 711 in the method shown in FIG. 7; or perform, by using at least one of the plurality of antennas 1506, steps 1103 and 1107 in the method shown in FIG. 11; or execute, by using at least one of the plurality of antennas 1506, actions executed by the terminal device in steps 1403 and 1407 in the method shown in FIG. 14. The receiver 15044 is specifically configured to: perform, by using at least one of the plurality of antennas 1506, steps 701, 705, and 709 in the method shown in FIG. 7; or perform, by using at least one of the plurality of antennas 1506, steps 1101 and 1105 in the method shown in FIG. 11; or execute, by using at least one of the plurality of antennas 1506, actions executed by the terminal device in steps 1401 and 1405 in the method shown in FIG. 14.

The memory 15015 may be various types of storage media such as a random access memory (RAM), a read-only memory (ROM), a nonvolatile random access memory (NVRAM), a programmable read-only memory (PROM), an erasable programmable read only memory (EPROM), an electrically erasable programmable read-only memory (EEPROM), a flash memory, an optical memory, and a register. The memory 15015 is specifically configured to store the instruction 15082 and the data 15084. The processor 1502 may perform the foregoing operations and/or steps by reading and executing the instruction 15082 stored in the memory 15015, and may need to use the data 15084 when performing the foregoing operations and/or steps.

The I/O interface 1510 is configured to: receive an instruction and/or data from a peripheral device, and output an instruction and/or data to the peripheral device.

It should be noted that in a specific implementation process, the terminal device 1500 may further include another hardware component. No further examples are listed one by one in this specification.

Figure 16:
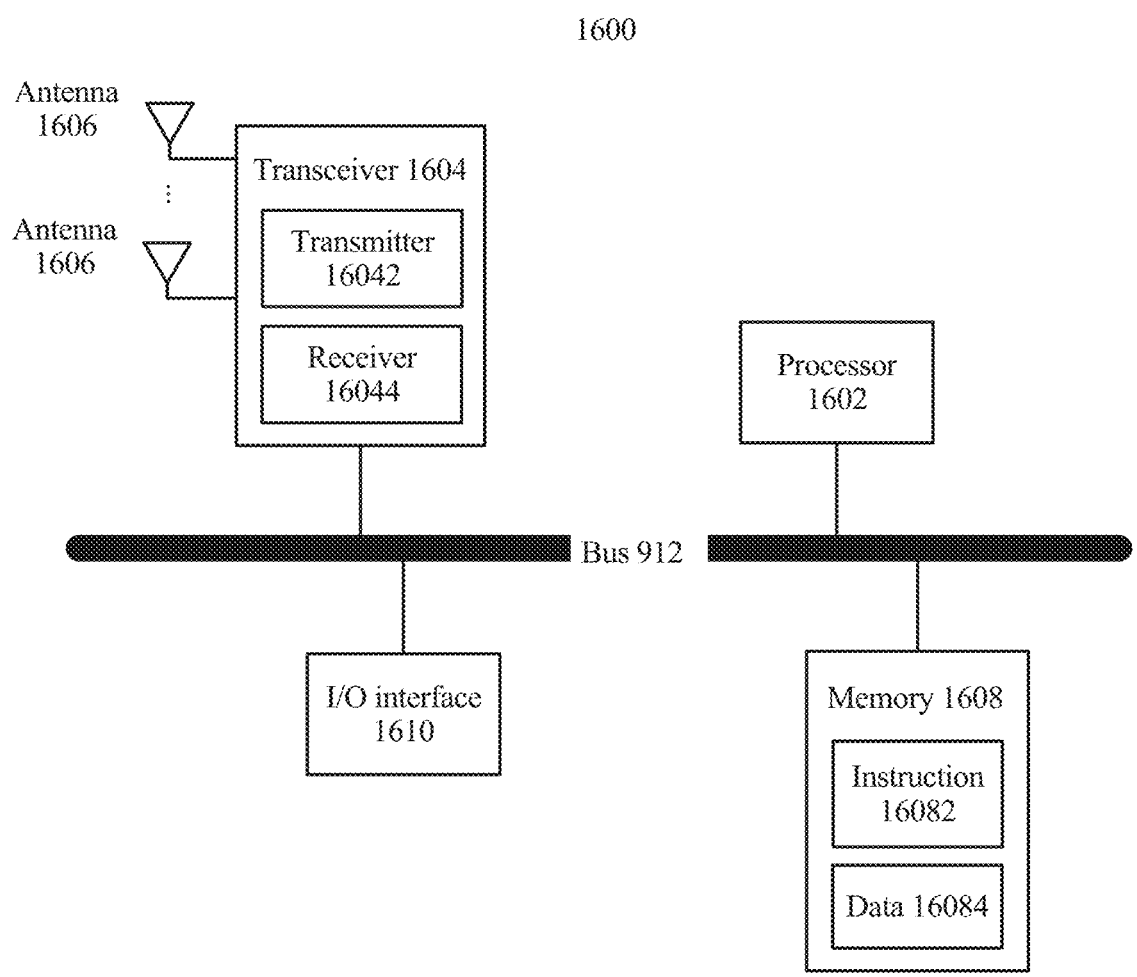
FIG. 16 is a schematic diagram of a hardware structure of a base station according to an embodiment of this patent application.

FIG. 16 is a schematic diagram of a hardware structure of a base station 1600 according to an embodiment of this patent application. As shown in FIG. 16, the base station 1600 includes a processor 1602, a transceiver 1604, a plurality of antennas 1606, a memory 1608, an I/O interface 1610, and a bus 1612. The transceiver 1604 further includes a transmitter 16042 and a receiver 16044, and the memory 1608 is further configured to store an instruction 16082 and data 16084. In addition, the processor 1602, the transceiver 1604, the memory 1608, and the I/O interface 1610 are communicatively connected to each other by using the bus 1612, and the plurality of antennas 1606 are connected to the transceiver 1604.

The processor 1602 may be a general purpose processor, by way of example but not limitation, a CPU, or may be a dedicated processor, by way of example but not limitation, a DSP, an ASIC, and an FPGA. In addition, the processor 1602 may alternatively be a combination of a plurality of processors. The processor 1602 is configured to perform, for example, steps 704, 708, and 712 in the method shown in FIG. 7. Alternatively, the processor 1602 is configured to perform, for example, steps 1104 and 1108 in the method shown in FIG. 11. Alternatively, the processor 1602 is configured to perform steps 1404 and 1408 in the method shown in FIG. 14. The processor 1602 may be a processor particularly designed to perform the foregoing operations and/or steps, or may perform the foregoing operations and/or steps by reading and executing the instruction 1608 stored in the memory 16082. The processor 1602 may need to use the data 16084 when performing the foregoing operations and/or steps.

The transceiver 1604 includes the transmitter 16042 and the receiver 16044. The transmitter 16042 is configured to send a downlink signal to a terminal device by using at least of the plurality of antennas 1606. The receiver 16044 is configured to receive an uplink signal from the terminal device by using at least one of the plurality of antennas 1606. The transmitter 16042 is specifically configured to: perform, by using at least one of the plurality of antennas 1606, steps 701, 705, and 709 in the method shown in FIG. 7; or perform, by using at least one of the plurality of antennas 1606, steps 1101 and 1105 in the method shown in FIG. 11; or execute, by using at least one of the plurality of antennas 1606, actions executed by the base station in steps 1401 and 1405 in the method shown in FIG. 14. The receiver 16044 is specifically configured to: perform, by using at least one of the plurality of antennas 1606, steps 703, 707, and 711 in the method shown in FIG. 7; or perform, by using at least one of the plurality of antennas 1606, steps 1103 and 1107 in the method shown in FIG. 11; or execute, by using at least one of the plurality of antennas 1606, actions executed by the base station in steps 1403 and 1407 in the method shown in FIG. 14.

The memory 1608 may be various types of storage media such as a RAM, a ROM, an NVRAM, a PROM, an EPROM, an EEPROM, a flash memory, an optical memory, and a register. The memory 1608 is specifically configured to store the instruction 16082 and the data 16084. The processor 1602 may perform the foregoing operations and/or steps by reading and executing the instruction 1608 stored in the memory 16082, and may need to use the data 16084 when performing the foregoing operations and/or steps.

The I/O interface 1610 is configured to: receive an instruction and/or data from a peripheral device, and output an instruction and/or data to the peripheral device.

It should be noted that in a specific implementation process, the base station 1600 may further include another hardware component. No further examples are listed one by one in this specification.

Figure 17:
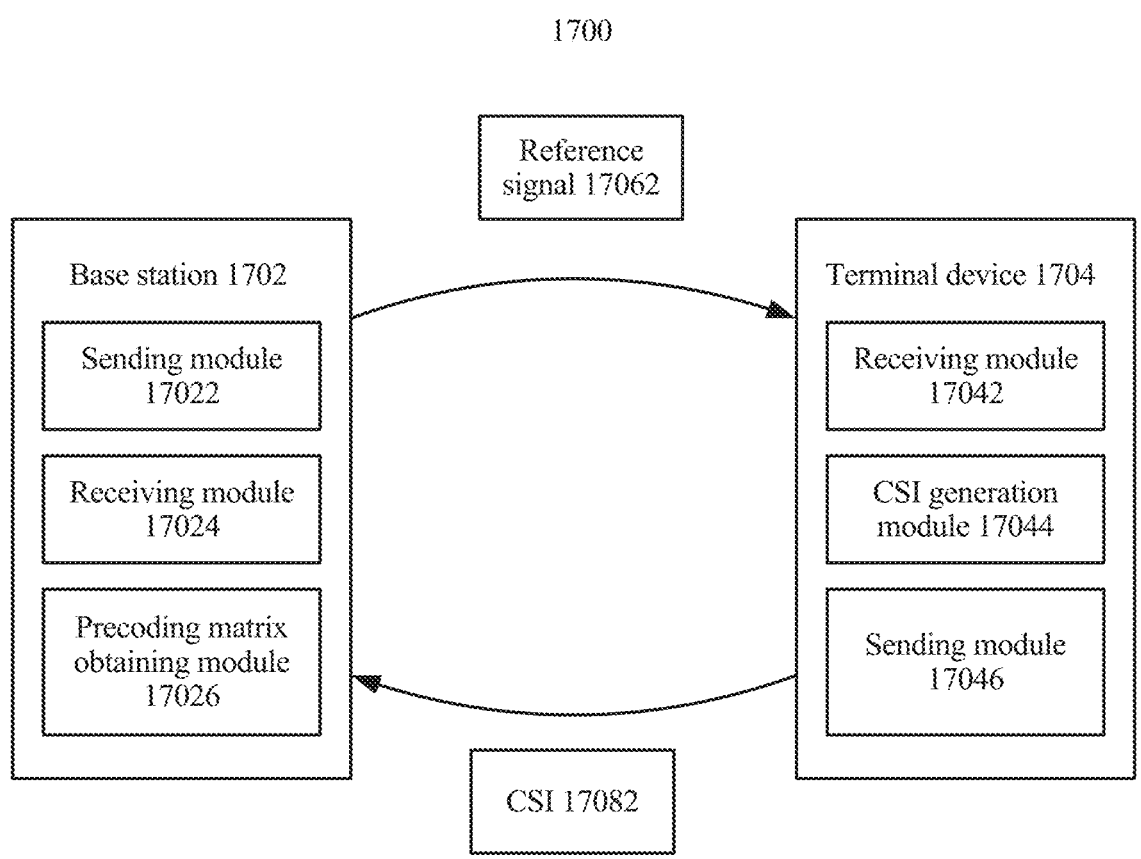
FIG. 17 is a schematic diagram of a CSI feedback process according to an embodiment of the present application.

FIG. 17 is a schematic diagram of a CSI feedback process according to an embodiment of the present disclosure. The CSI feedback process is performed between a base station 1702 and a terminal device 1704. As shown in FIG. 17, the base station 1702 specifically includes a sending module 17022, a receiving module 17024, and a precoding matrix obtaining module 17026. The terminal device 1704 specifically includes a receiving module 17042, a CSI generation module 17044, and a sending module 17046. The precoding matrix obtaining module 17026 and the CSI generation module 17044 may be implemented by using a processor or a processing module. The sending module 17022 and the sending module 17046 may be implemented by using a transmitter. The receiving module 17024 and the receiving module 17042 may be implemented by using a receiver. The transmitter and the receiver on the base station may be separated components or an integrated component. The transmitter and the receiver on the terminal device may be separated components or an integrated component.

The sending module 17022 of the base station 1702 sends a downlink symbol, and the downlink symbol carries a reference signal 17062. Specifically, the downlink symbol may be, by way of example but not limitation, an orthogonal frequency division multiplexing (OFDM) symbol. The OFDM symbol is usually obtained by performing weighted summation on a group of subcarriers, and a weight of a subcarrier is a to-be-sent modulation symbol (generally, in a plural form), and includes a pilot.

The receiving module 17024 of the terminal device 1704 receives the downlink symbol.

The CSI generation module 17044 of the terminal device 1704 obtains channel state information based on the reference signal 17062 included in the downlink symbol.

Then, the CSI generation module 17044 determines an appropriate precoding matrix based on the foregoing channel matrix and a basic codebook, and generates CSI based on the precoding matrix.

The sending module 17046 of the terminal device 1704 subsequently sends an uplink symbol to the base station 1702, and the uplink symbol carries CSI 17082.

The receiving module 17024 of the base station 1702 receives the uplink symbol, and extracts the carried CSI 17082.

The precoding matrix obtaining module 17026 of the base station 1702 obtains a corresponding precoding matrix based on the CSI 17082.

In this patent application, the precoding matrix is of a three-level structure, and $F=C_1C_2W$, where $C_1$ is a first-level precoding matrix, $C_2$ is a second-level precoding matrix, and W is a third-level precoding matrix.

The reference signal 17062 sent by the sending module 17022 of the base station 1702 may include a first-level reference signal. The receiving module 17042 of the terminal device 1704 receives the first-level reference signal. The CSI generation module 17044 of the terminal device 1704 determines beam information based on the first-level reference signal. The beam information is first-level CSI information generated by the CSI generation module 17044. Correspondingly, the sending module 17046 of the terminal device 1704 sends the first-level CSI information. The receiving module 17024 of the base station 1702 receives the first-level CSI information. The precoding matrix obtaining module 17026 of the base station 1702 determines the first-level precoding matrix based on the first-level CSI information.

The reference signal 17062 sent by the sending module 17022 of the base station 1702 may include a second-level reference signal. The receiving module 17042 of the terminal device 1704 receives the second-level reference signal. The CSI generation module 17044 of the terminal device 1704 determines long-term wideband channel information based on the second-level reference signal. The long-term wideband channel information is second-level CSI information generated by the CSI generation module 17044. Correspondingly, the sending module 17046 of the terminal device 1704 sends the second-level CSI information. The receiving module 17024 of the base station 1702 receives the second-level CSI information. The precoding matrix obtaining module 17026 of the base station 1702 determines the second-level precoding matrix based on received second-level CSI information of all terminal devices.

The reference signal 17062 sent by the sending module 17022 of the base station 1702 may include a third-level reference signal. The receiving module 17042 of the terminal device 1704 receives the third-level reference signal. The CSI generation module 17044 of the terminal device 1704 determines instantaneous channel information based on the third-level reference signal. The instantaneous channel information is third-level CSI information generated by the CSI generation module 17044. Correspondingly, the sending module 17046 of the terminal device 1704 sends the third-level CSI information. The receiving module 17024 of the base station 1702 receives the third-level CSI information. The precoding matrix obtaining module 17026 of the base station 1702 determines the third-level precoding matrix based on received third-level CSI information of all terminal devices.

This patent application provides a three-level channel information feedback solution, so that a spatial dimension can be effectively reduced, thereby reducing pilot and channel feedback overheads. In addition, baseband processing complexity and radio frequency implementation difficulty can be effectively reduced.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this patent application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel state information feedback method comprising:
   sending, by a base station, a reference signal to a terminal device, wherein the reference signal includes a first level reference signal and second level reference signal;
   receiving, by the base station, a second-level channel state information sent by the terminal device in response to the second level reference signal, wherein the second-level channel state information includes a long-term wideband channel information comprising information about a channel space correlation matrix; and
   determining, by the base station, a precoding matrix F based on the lone-term wideband channel information, wherein the precoding matrix $F=C_1C_2W$, $C_1$ is a first-level precoding matrix, $C_2$ is a second-level precoding matrix, W is a third level precoding matrix, a first-level channel state information corresponding to $C_1$ comprises beam information, the second-level channel state information corresponding to $C_2$ comprises the long-term wideband channel information and enables reducing of a spatial dimension of at least one virtual sector, and a third-level channel state information corresponding to W comprises instantaneous channel information.

2. The channel state information feedback method according to claim 1, wherein receiving, by the base station, the first-level channel state information sent by the terminal device comprises receiving, by the base station, the beam information sent by the terminal device, wherein the beam information is determined based on the first-level reference signal;
   determining, by the base station, the precoding matrix based on the first-level channel state information comprises determining, by the base station, the first-level precoding matrix based on the beam information.

3. The channel state information feedback method according to claim 1, further comprising:
   sending, by the base station, a third-level reference signal to the terminal device;
   receiving, by the base station, the instantaneous channel information sent by the terminal device, wherein the instantaneous channel information is determined based on the third-level reference signal;
   determining the third-level preceding matrix W based on the received instantaneous channel information; and
   determining, by the base station, the precoding matrix F based on the long-term wideband channel information.

4. A channel state information feedback method comprising:
   receiving, by a terminal device, a reference signal sent by a base station, wherein the reference signal includes a first level reference signal and second level reference signal;
   determining, by the terminal device, a second-level channel state information based on the second-level reference signal, wherein the second-level channel state information includes a long-term wideband channel information comprising information about a channel space correlation matrix; and
   sending, by the terminal device, the long-term wideband channel information to the base station for enabling the base station to determine a precoding matrix F,
      wherein the precoding matrix $F=C_1C_2W$, $C_1$ is a first-level precoding matrix, $C_2$ is a second-level precoding matrix, w a third level precoding matrix, a first-level channel state information corresponding to $C_1$ comprises beam information, the second-level channel state information corresponding to $C_2$ comprises the long-term wideband channel information and enables reducing of a spatial dimension of at least one virtual sector, and a third-level channel state information corresponding to W comprises instantaneous channel information.

5. The channel state information feedback method according to claim 4, wherein determining, by the terminal device, the first-level channel state information based on the first-level reference signal comprises determining, by the terminal device, the beam information based on the first-level reference signal; and
   sending, by the terminal device, the lone-term wideband channel information to the base station comprises sending, by the terminal device, the beam information to the base station.

6. The channel state information feedback method according to claim 4, further comprising:
   receiving, by the terminal device, a third-level reference signal sent by the base station;
   determining, by the terminal device, the instantaneous channel information based on the received third-level reference signal; and
   sending, by the terminal device, the instantaneous channel information to the base station for enabling the base station to determine the third-level preceding matrix W based on instantaneous channel information, and to determine the preceding matrix F.

7. A terminal device comprising:
   a processor;
   a transmitter and receiver coupled to the processor; and a memory coupled to the processor and configured to store instructions which, when executed by the processor, cause the terminal device to:
  receive, by the receiver, a reference signal sent by a base station, wherein the reference signal includes a first level reference signal and second level reference signal;
  determine, by the processor, a second-level channel state information based on the second-level reference signal, wherein the second-level channel state information includes a long-term wideband channel information comprising information about a channel space correlation matrix; and
  send, by the transmitter, the long-term wideband channel information to the base station for enabling the base station to determine a precoding matrix F,
  wherein the precoding matrix $F=C_1C_2W$, $C_1$ is a first-level precoding matrix, $C_2$ is a second-level precoding matrix, w is matrix, a first-level channel state information corresponding to $C_1$ comprises beam information, the second-level channel state information corresponding to $C_2$ comprises the long-term wideband channel information and enables reducing of a spatial dimension of at least one virtual sector, and a third-level channel state information corresponding to W comprises instantaneous channel information.

8. The terminal device according to claim 7, wherein the instructions when executed by the processor, further cause the terminal device to:
  determine, by the processor, the beam information based on the first-level reference signal, and
  send, by the transmitter, the beam information to the base station.

9. The terminal device according to claim 7, wherein the instructions, when executed by the processor, further cause the terminal device to
  receive, by the receiver, a third-level reference signal sent by a base station,
  determine, by the processor, the instantaneous channel information based on the third-level reference signal, and
  send, by the transmitter, the instantaneous channel information to the base station for enabling the base station to determine the second-level precoding matrix W based on the instantaneous channel information, and to determine the precoding matrix F.

10. A base station comprising:
a processor;
a transmitter and receiver; and
a memory configured to store instructions which, when executed by the processor, causes the base station to:
  send, by the transmitter, a reference signal to a terminal device, wherein the reference signal includes a first level reference signal and second level reference signal;
  receive, by the receiver, a second-level channel state information sent by the terminal device in response to the second level reference signal wherein the second-level channel state information includes a long-term wideband channel information comprising information about a channel space correlation matrix; and
  determine, by the processor, a precoding matrix F based on the long-term wideband channel information,
  wherein the precoding matrix $F=C_1C_2W$, $C_1$ is a first-level precoding matrix, $C_2$ is a second-level precoding matrix, W is a third-level precoding matrix, a first-level channel state information corresponding to $C_1$ corresponding to $C_2$ comprises the long-term wideband channel information and enables reducing of a spatial dimension of at least one virtual sector, and a third-level channel state information corresponding to W comprises instantaneous channel information.

11. The base station according to claim 10, wherein the instructions when executed by the processor, further cause the base station to:
  receive, by the receiver, the beam information sent by the terminal device, wherein the beam information is determined based on the first-level reference signal, and
  determine, by the processor, the first-level precoding matrix $C_1$ based on the beam information.

12. The base station according to claim 10, wherein the instructions, when executed by the processor, further cause the base station to
  send, by the transmitter, a third-level reference signal to a terminal device;
  receive, by the receiver, the instantaneous channel information sent by the terminal device, wherein the instantaneous channel information is determined based on the third-level reference signal; and
  determine the third-level precoding matrix W based on the received instantaneous channel information.

\* \* \* \* \*

UNITED STATES PATENT AND TRADEMARK OFFICE
CERTIFICATE OF CORRECTION

PATENT NO. : 10,680,697 B2
APPLICATION NO. : 16/185383
DATED : June 9, 2020
INVENTOR(S) : Wu et al.

Page 1 of 1

It is certified that error appears in the above-identified patent and that said Letters Patent is hereby corrected as shown below:

Claim 1: Column 23, Line 47: "based on the lone-term wideband channel information," should read -- based on the long-term wideband channel information, --.
Claim 3: Column 24, Line 11: "determining the third-level preceding matrix W based on" should read -- determining the third-level precoding matrix W based on --.
Claim 4: Column 24, Line 31-32: "precoding matrix, w a third level precoding matrix, a" should read -- precoding matrix, W a third-level precoding matrix, a --.
Claim 5: Column 24, Line 47: "sending, by the terminal device, the lone-term wideband" should read -- sending, by the terminal device, the long-term wideband --.
Claim 6: Column 24, Line 60: "station to determine the third-level preceding matrix W" should read -- station to determine the third-level precoding matrix W --.
Claim 7: Column 25, Line 19: "precoding matrix, w is matrix, a first-level channel" should read -- precoding matrix, W is a third-level precoding matrix, a first-level channel --.
Claim 10: Column 26, Line 8: "level reference signal and second level reference signal;" should read -- level reference signal and second level reference signal: --.
Claim 10: Column 26, Line 21: "$C_1$ corresponding to $C_2$ comprises the long-term" should read -- $C_1$ comprises beam information, the second-level channel state information corresponding to $C_2$ comprises the long-term --.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*